United States Patent
Chang et al.

(10) Patent No.: US 8,379,147 B2
(45) Date of Patent: Feb. 19, 2013

(54) ADAPTIVE VIDEO PROCESSING CIRCUITRY AND TECHNIQUES

(75) Inventors: Edward Chang, Saratoga, CA (US); Herbert Huang, Mountain View, CA (US)

(73) Assignee: Telegent Systems, Inc., Sunnyvale, CA (US)

( * ) Notice: Subject to any disclaimer, the term of this patent is extended or adjusted under 35 U.S.C. 154(b) by 354 days.

(21) Appl. No.: 12/794,683

(22) Filed: Jun. 4, 2010

(65) Prior Publication Data

US 2010/0328468 A1    Dec. 30, 2010

Related U.S. Application Data

(60) Provisional application No. 61/219,875, filed on Jun. 24, 2009.

(51) Int. Cl.
*H04N 11/20* (2006.01)
*H04N 5/21* (2006.01)

(52) U.S. Cl. .................. 348/448; 348/452; 348/607

(58) Field of Classification Search .......... 348/448, 348/452, 607, 618–620, 700, 701, 606, 625; 382/298–300; 375/240.26
See application file for complete search history.

(56) References Cited

U.S. PATENT DOCUMENTS

| | | | |
|---|---|---|---|
| 4,663,661 A | | 5/1987 | Weldy et al. |
| 4,941,045 A | * | 7/1990 | Birch .............................. 348/448 |
| 5,019,903 A | * | 5/1991 | Dougall et al. ................ 348/448 |
| 5,175,619 A | * | 12/1992 | Willis ............................ 348/448 |
| 5,280,350 A | * | 1/1994 | DeHaan et al. ................ 348/441 |
| 5,589,992 A | | 12/1996 | Shibata et al. |
| 5,703,662 A | | 12/1997 | Yoon |
| 5,742,346 A | | 4/1998 | Sievers et al. |
| 5,793,435 A | * | 8/1998 | Ward et al. .................... 348/448 |
| 5,986,720 A | | 11/1999 | Kishigami et al. |
| 6,040,873 A | * | 3/2000 | Izumi et al. ................... 348/559 |
| 6,118,489 A | * | 9/2000 | Han et al. ...................... 348/452 |
| 6,145,033 A | | 11/2000 | Chee |
| 6,219,102 B1 | * | 4/2001 | Wagner et al. ................ 348/448 |
| 6,414,719 B1 | * | 7/2002 | Parikh ............................ 348/448 |
| 7,453,526 B2 | | 11/2008 | Yun et al. |
| 7,573,530 B2 | * | 8/2009 | Zhong ............................ 348/452 |
| 2001/0015768 A1 | * | 8/2001 | Shin et al. ..................... 348/452 |

(Continued)

OTHER PUBLICATIONS

"Spatio-Temporal Video Interpolation and Denoising using Motion-Assisted Steering Kernel (MASK) Regression", Takeda et al., Image Processing, 2008. ICIP 2008, $15^{th}$ IEEE international conference, IEEE, Piscataway, NJ, USA, Oct. 12, 2008, pp. 637-640.

(Continued)

*Primary Examiner* — Victor Kostak
(74) *Attorney, Agent, or Firm* — Richard T. Ogawa; Ogawa P.C.

(57) ABSTRACT

Video processing circuitry to adaptively process input video data which corresponds to a plurality of video frames of a selected channel which is one of a plurality of channels of a broadcast spectrum. In one aspect, the video processing circuitry includes spatial adaptation circuitry to generate and output spatially adapted video data corresponding to the plurality of video frames, temporal adaptation circuitry to generate and output temporally adapted video data corresponding to the plurality of video frames, and video manipulation circuitry, coupled to the spatial adaptation circuitry and the temporal adaptation circuitry, to generate output video data corresponding to the plurality of video frames, using the input video data, the spatially adapted video data and the temporally adapted video data. Methods of adaptively processing input video data which corresponds to a plurality of video frames of a selected channel which is one of a plurality of channels of a broadcast spectrum are also disclosed.

21 Claims, 29 Drawing Sheets

U.S. PATENT DOCUMENTS

| | | |
|---|---|---|
| 2001/0033660 A1 | 10/2001 | Maeda |
| 2002/0031187 A1 | 3/2002 | Kim |
| 2003/0026590 A1 | 2/2003 | Todo et al. |
| 2003/0071917 A1 | 4/2003 | Selby et al. |
| 2004/0070686 A1* | 4/2004 | Jung et al. .................... 348/448 |
| 2004/0179108 A1* | 9/2004 | Sorek et al. ................ 348/216.1 |
| 2004/0207754 A1* | 10/2004 | Choi et al. .................... 348/452 |
| 2006/0158550 A1* | 7/2006 | Zhou et al. .................... 348/452 |
| 2008/0062309 A1* | 3/2008 | Zhai et al. .................... 348/452 |
| 2008/0278623 A1* | 11/2008 | Lu et al. ........................ 348/452 |

OTHER PUBLICATIONS

"Video-Conversion Techniques Ensure a Sharper Image", Intihar B., EDN—Electrical Design News, Reed Business Information, vol. 43, No. 6, Mar. 13, 1998, pp. 97-107.

* cited by examiner

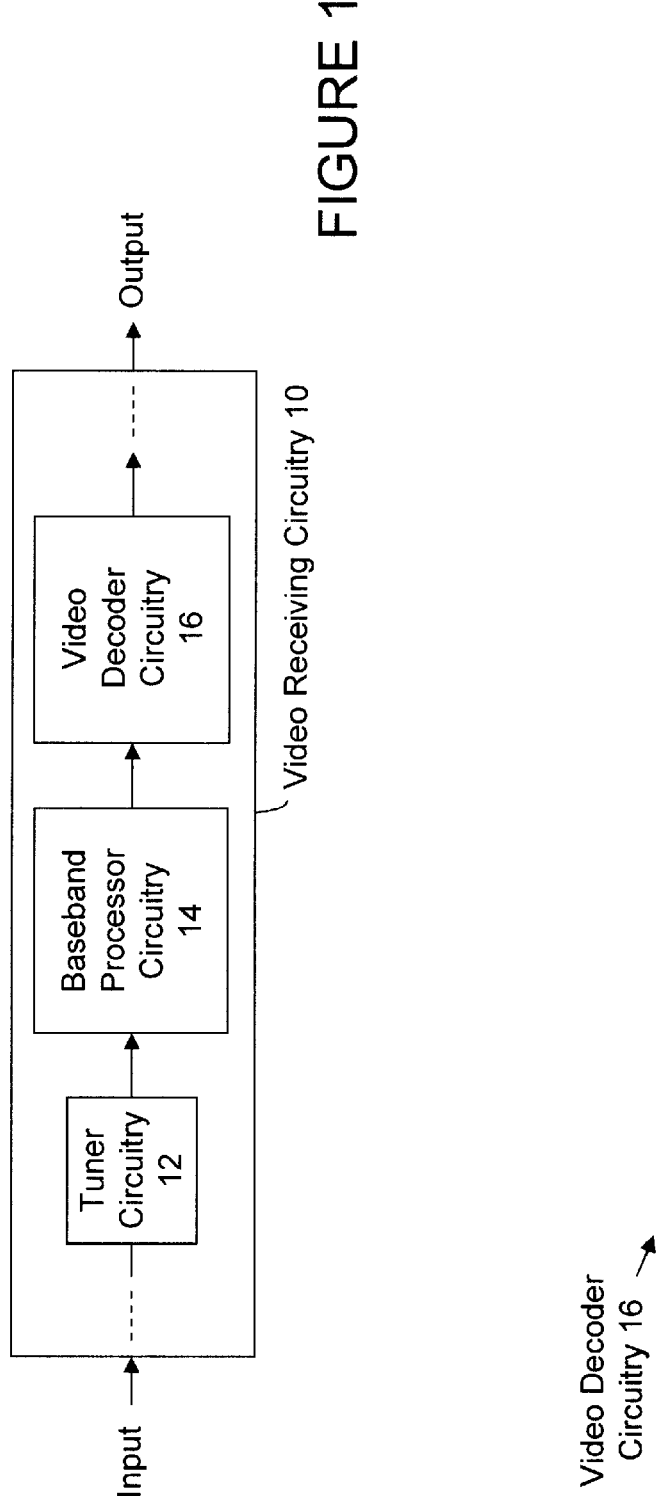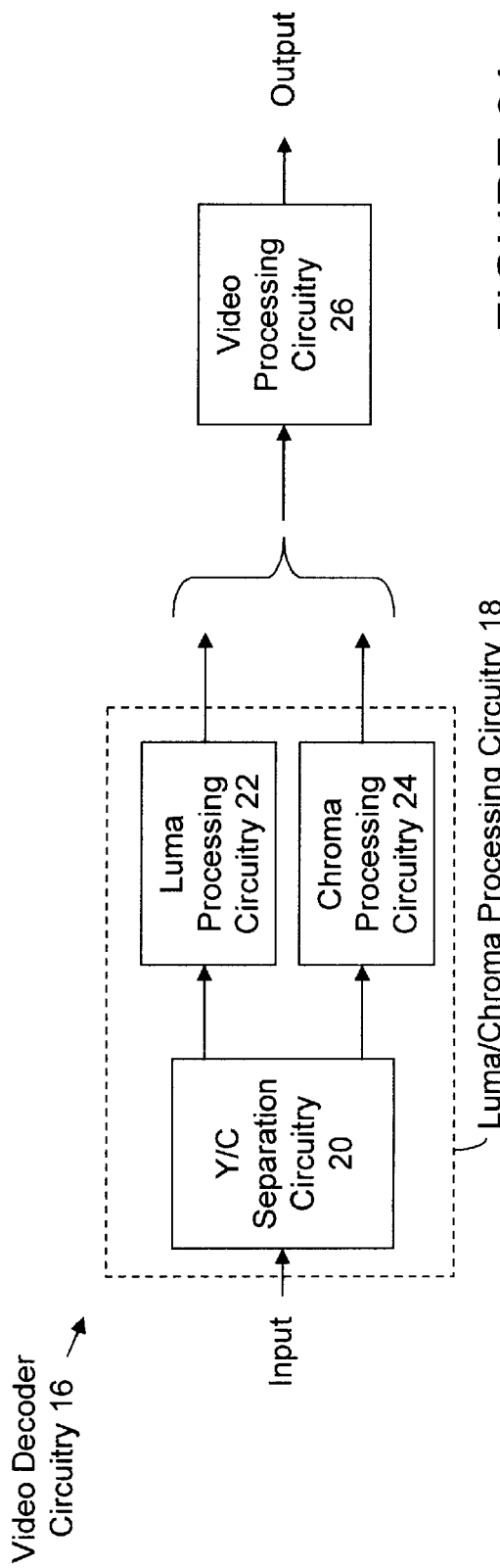

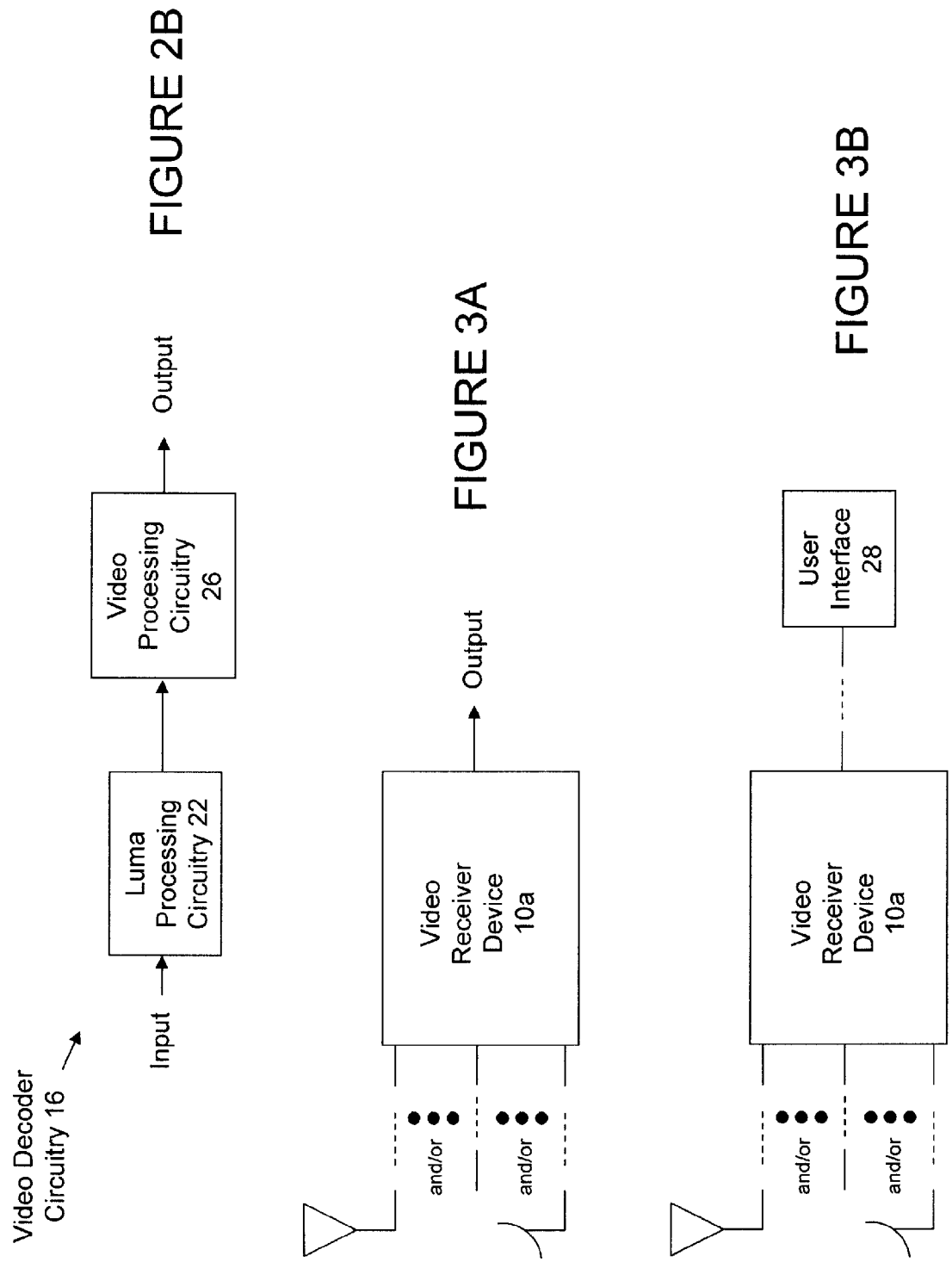

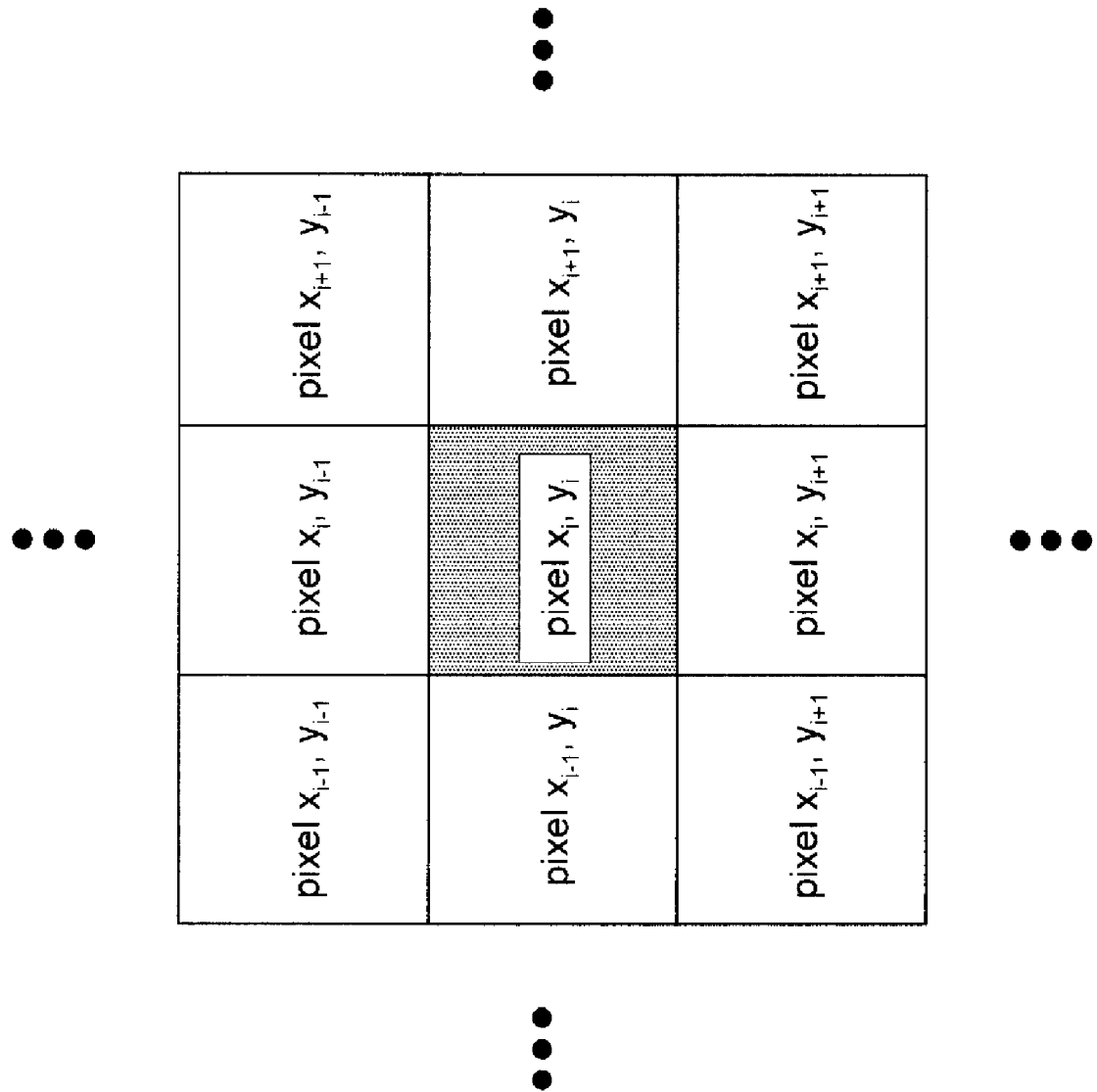

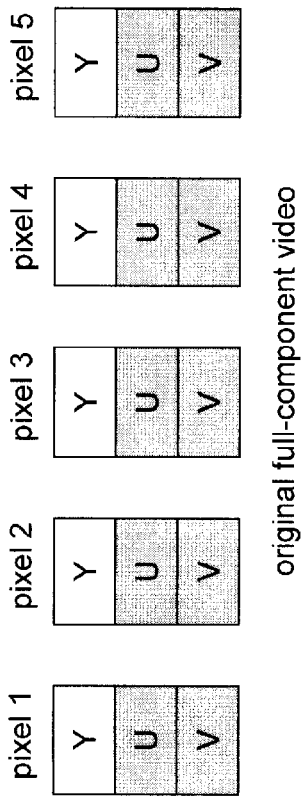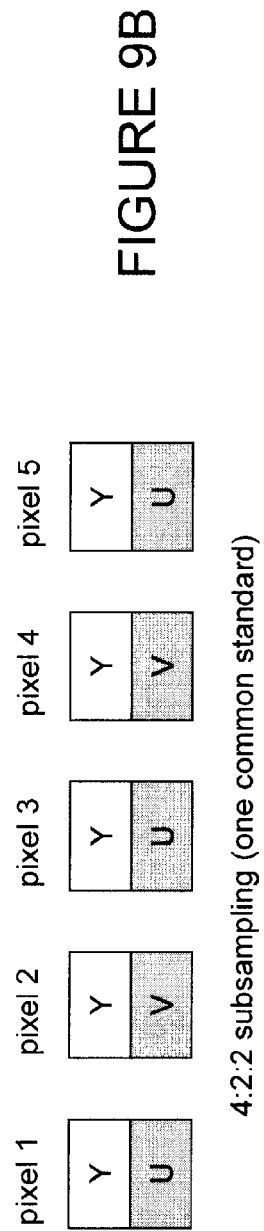

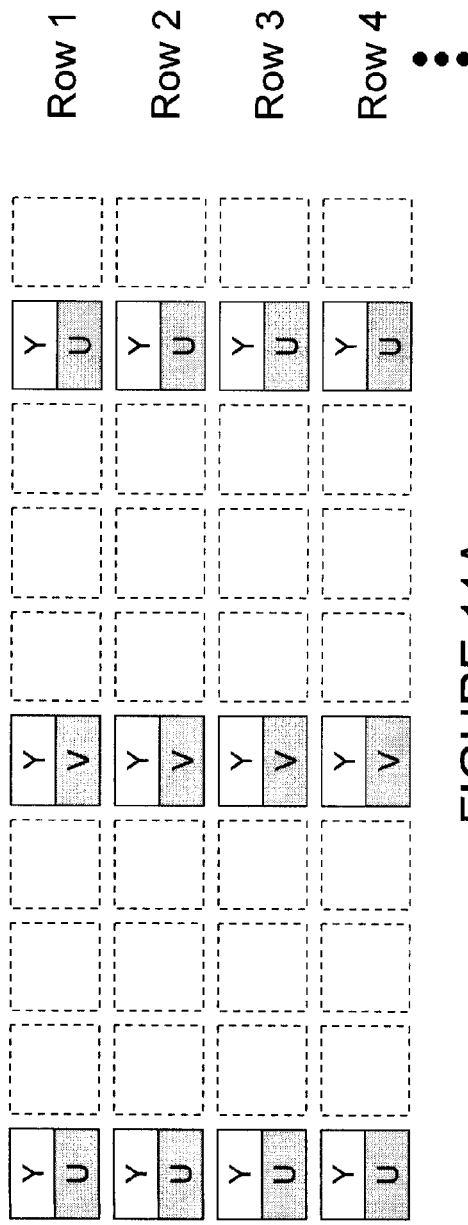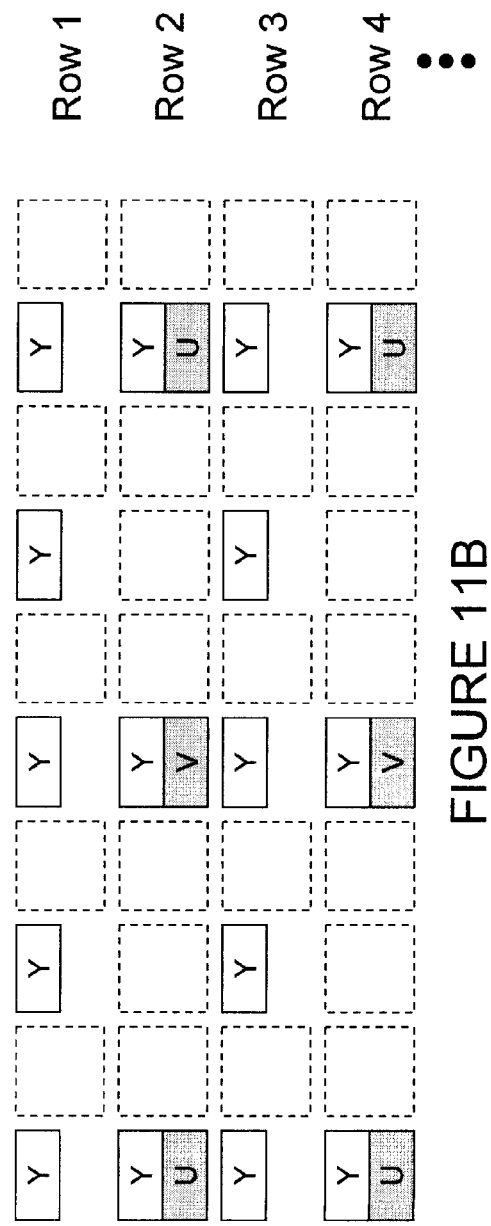

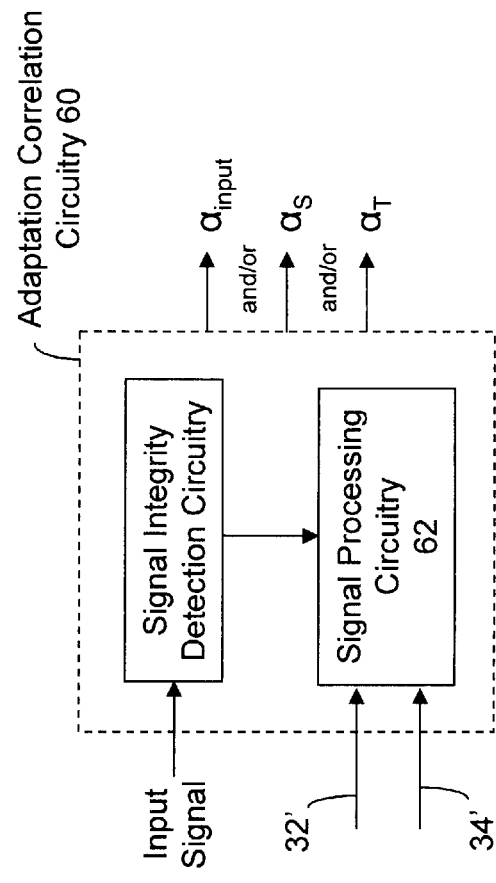
FIGURE 14A
FIGURE 14B
FIGURE 14C

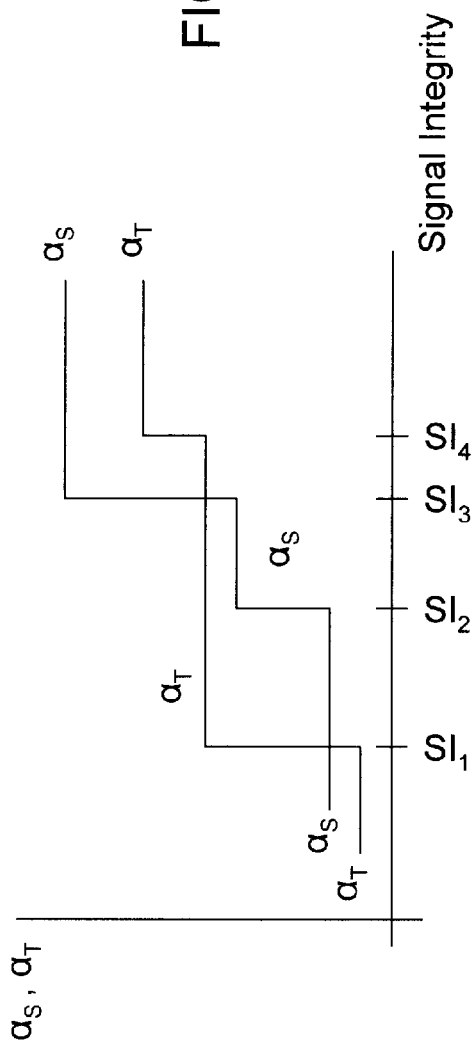
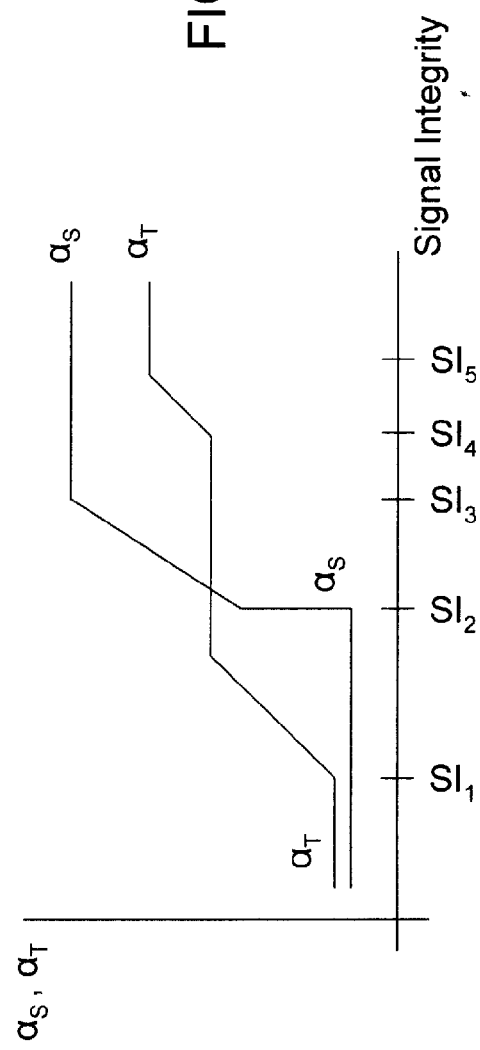

ADAPTIVE VIDEO PROCESSING CIRCUITRY AND TECHNIQUES

RELATED APPLICATION

This non-provisional application claims priority to U.S. Provisional Application Ser. No. 61/219,875, entitled "Adaptive Video Processing Circuitry and Techniques", filed Jun. 24, 2009; the contents of the U.S. Provisional Application are incorporated by reference herein, in their entirety.

INTRODUCTION

In one aspect, the present inventions relate to circuitry to adaptively process video data to, for example, improve, modify and/or enhance video images recovered from a video broadcast (for example, satellite, terrestrial and/or cable video transmission (for example, analog or digital TV broadcast)). The circuitry which adaptively processes the video data may address, reduce and/or minimize the adverse impact of noise (or the like) in/on the video data resulting from, produced or caused by, for example, signal interference or amplification of low power video signals recovered from a video broadcast (for example, satellite, terrestrial and/or cable video transmission (for example, analog or digital TV broadcast)). The present inventions also relate to methods of adaptively processing video data. Such circuitry and techniques may increase sharpness and reduce motion smearing relative to conventional techniques.

In another aspect, the present inventions relate to circuitry and techniques for down-sampling and/or compressing video data to, for example, store such data in memory. The present inventions further relate to reading such down-sampled and/or compressed video data from memory and thereafter, up-sampling or de-compressing such down-sampled and/or compressed video data to, for example, facilitate further processing the video data and, for example, to output and/or display the further processed video data. Such circuitry and techniques may reduce the amount of memory used to store video data during, for example, the adaptively processing of video data.

Notably, the present inventions may be employed in conjunction with any analog or digital broadcast transmission regime and video standard (for example, NTSC, PAL, SECAM or DVB-T), whether now known or later developed. Moreover, the circuitry according to the present inventions may output video data in accordance with any video data output standard (for example, standard RGB video output standard (for example, NTSC, PAL or SECAM) or ATSC or ITU-R BT.601 digital standard), whether now known or later developed; all of which, when adaptively processed in accordance with or using one or more of the present inventions, are intended to fall within the scope of the present inventions.

SUMMARY

There are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, many of those permutations and combinations will not be discussed separately herein.

Importantly, the present inventions are neither limited to any single aspect nor embodiment, nor to any combinations and/or permutations of such aspects and/or embodiments. Moreover, each of the aspects of the present inventions, and/or embodiments thereof, may be employed alone or in combination with one or more of the other aspects and/or embodiments thereof. For the sake of brevity, certain permutations and combinations are not discussed and/or illustrated separately herein.

In a first principle aspect, certain of the present inventions are directed to circuitry and techniques of a video processing circuitry to adaptively process input video data which corresponds to a plurality of video frames of a selected channel which is one of a plurality of channels of a broadcast spectrum. The video processing circuitry of this aspect of the invention comprises spatial adaptation circuitry to generate and output spatially adapted video data corresponding to the plurality of video frames, including spatially adapted video data corresponding to a given video frame using video data of a video frame which is related to the given video frame. The video processing circuitry also includes temporal adaptation circuitry to generate and output temporally adapted video data corresponding to the plurality of video frames, including temporally adapted video data corresponding to the given video frame using video data which is temporally related to the given video frame. In addition, the video processing circuitry includes video manipulation circuitry, coupled to the spatial adaptation circuitry and the temporal adaptation circuitry, to generate output video data corresponding to the plurality of video frames, using the input video data, the spatially adapted video data and the temporally adapted video data, wherein the video manipulation circuitry is configured to generate output video data corresponding to the given video frame of the selected channel of the broadcast spectrum using (i) the input video data corresponding to the given video frame, (ii) the spatially adapted video data which corresponds to the given video frame and (iii) the temporally adapted video data which corresponds to the given video frame.

In one embodiment, the video manipulation circuitry includes summer circuitry to generate output video data corresponding to the given video frame by summing, on a pixel-by-pixel, (i) the input video data corresponding to the given video frame, (ii) spatially adapted video data corresponding to the given of video frame and (iii) temporally adapted video data corresponding to the given of video frame.

The spatial adaptation circuitry may generate each pixel of the given video frame by applying the input video data which corresponds to the given video frame to a spatially defocusing or blurring filter. The spatial adaptation circuitry may generate each pixel of the given video frame by applying the input video data which corresponds to the given video frame to a finite impulse response filter.

The temporal adaptation circuitry, in one embodiment, generates temporally adapted video data corresponding to the given video frame using video data which is representative of a sum, on a pixel-by-pixel, of video data of a plurality of video frames that temporally precede the given video frame.

The video processing circuitry may also include a scaling circuit, coupled to the output of the temporal adaptation circuitry, to scale the temporally adapted video data. In addition thereto, or in lieu thereof, the video processing circuitry includes a scaling circuit, coupled to the output of the spatial adaptation circuitry, to scale the spatially adapted video data. The scaling of the temporally adapted video data and/or spatially adapted video data may be programmable (for example, during operation of the video processing circuitry) or fixed. Indeed, the amount of scaling by the scaling circuit of the spatially adapted video data corresponding to the given video frame may be responsive to motion in the input video data corresponding to the given video frame.

Notably, the video processing circuitry may include motion detection circuitry, coupled to the scaling circuit, to generate a scale control signal which is representative of the amount of scaling applied by the scaling circuit to the spatially adapted video data corresponding to the given video frame.

In one embodiment of this aspect of the invention, the video processing circuitry includes: (i) a first scaling circuit, electrically coupled to an input of the video manipulation circuitry to scale the input video data used by the video manipulation circuitry, to generate output video data corresponding to the plurality of video frames, (ii) a second scaling circuit, electrically coupled to an input of the video manipulation circuitry, to scale the spatially adapted video data used by the video manipulation circuitry to generate output video data corresponding to the plurality of video frames, and (iii) a third scaling circuit, electrically coupled to an input of the video manipulation circuitry, to scale the temporally adapted video data used by the video manipulation circuitry to generate output video data corresponding to the plurality of video frames. The amount of scaling of the input video data, temporally adapted video data and/or spatially adapted video data may be programmable (for example, during operation of the video processing circuitry) or fixed.

Notably, the video processing circuitry may also include adaptation correlation circuitry, coupled to the first, second and third scaling circuits, to generate a scale control signal, during operation of the video processing circuitry, which is representative of the amount of scaling applied by each of the scaling circuits.

In another principle aspect, the present inventions are directed to a method of adaptively processing input video data which corresponds to a plurality of video frames of a selected channel which is one of a plurality of channels of a broadcast spectrum. The method of this aspect of the inventions comprises generating spatially adapted video data corresponding to the plurality of video frames, generating temporally adapted video data corresponding to the plurality of video frames, generating output video data, on a pixel-by-pixel basis, of each video frame of the plurality of video frames of the selected channel using the input video data, the spatially adapted video data and the temporally adapted video data, and outputting the output video data which corresponds to a plurality of video frames of the selected channel which is one of the plurality of channels of the broadcast spectrum.

In one embodiment, generating output video data corresponding to the plurality of video frames further includes generating the output video data for each video frame of the plurality of video frames by summing, on a pixel-by-pixel basis, (i) the input video data, (ii) the spatially adapted video data and (iii) the temporally adapted video data of each video frame of the plurality of video frames. In another embodiment, generating the spatially adapted video data corresponding to the plurality of video frames includes generating the spatially adapted video data for each frame of the plurality of video frames by spatially defocusing or blurring the input video data of the plurality of video frames on a pixel-by-pixel basis. Indeed, in another embodiment, generating temporally adapted video data corresponding to the plurality of video frames includes generating temporally adapted video data for each video frame of the plurality of video frames by summing, on a pixel-by-pixel, video data of a video frame with one or more temporally preceding video frames.

The method may further include scaling the spatially adapted video data, wherein generating output video data corresponding to the plurality of video frames uses a scaled version of the spatially adapted video data. The amount of scaling the spatially adapted video data may be programmable during operation of the video processing circuitry.

In one embodiment, the method further includes: (i) scaling the input video data, wherein generating output video data corresponding to the plurality of video frames uses a scaled version of the input video data, (ii) scaling the temporally adapted video data, wherein generating output video data corresponding to the plurality of video frames uses a scaled version of the temporally adapted video data, and (iii) determining an amount of scaling of the spatially adapted video data and the temporally adapted video data based on detecting motion in the video of the input video data. Notably, the amount of scaling of the input video data, temporally adapted video data and/or spatially adapted video data may be programmable (for example, during operation of the video processing circuitry) or fixed.

In another principle aspect, the present inventions are directed to a machine readable storage medium having information stored thereon comprising data representing an expression of a video processing circuitry to adaptively process input video data which corresponds to a plurality of video frames of a selected channel which is one of a plurality of channels of a broadcast spectrum. The expression of the video processing circuitry comprises spatial adaptation circuitry to generate and output spatially adapted video data corresponding to the plurality of video frames, including spatially adapted video data corresponding to a given video frame using video data of a video frame which is related to the given video frame;

temporal adaptation circuitry to generate and output temporally adapted video data corresponding to the plurality of video frames, including temporally adapted video data corresponding to the given video frame using video data which is temporally related to the given video frame; and video manipulation circuitry, coupled to the spatial adaptation circuitry and the temporal adaptation circuitry, to generate output video data of each frame of the plurality of video frames, using the input video data, the spatially adapted video data and the temporally adapted video data, wherein:

the video manipulation circuitry is configured to generate output video data corresponding to the given video frame using (i) the input video data which corresponds to the given video frame, (ii) spatially adapted video data which corresponds to the given video frame and (iii) temporally adapted video data which corresponds to the given video frame.

In another principle aspect, the present inventions are directed to a method of testing video processing circuitry which adaptively processes input video data corresponding to a plurality of video frames of a selected channel which is one of a plurality of channels of a broadcast spectrum. The method of this aspect of the present inventions comprises applying signals to spatial adaptation circuitry to generate and output spatially adapted video data corresponding to the plurality of video frames, applying signals to the temporal adaptation circuitry to generate and output temporally adapted video data corresponding to the plurality of video frames, applying signals to video manipulation circuitry to generate output video data corresponding to the plurality of video frames, using the input video data, the spatially adapted video data and the temporally adapted video data; and outputting the output video data which corresponds to a plurality of video frames of the selected channel.

In yet another principle aspect, the present inventions are directed to a method of simulating video processing circuitry which adaptively processes input video data corresponding to a plurality of video frames of a selected channel which is one of a plurality of channels of a broadcast spectrum. The method of this aspect of the present inventions comprises (i) generating spatially adapted video data corresponding to the plurality of video frames, (ii) generating temporally adapted video data corresponding to the plurality of video frames, (iii) generating output video data corresponding to the plurality of video frames, using the input video data, the spatially adapted video data and the temporally adapted video data, and (iv) outputting the output video data of the selected channel of the broadcast spectrum.

As stated herein, there are many inventions, and aspects of the inventions, described and illustrated herein. This Summary is not exhaustive of the scope of the present inventions. Indeed, this Summary may not be reflective of or correlate to the inventions protected by the claims in this or continuation/divisional applications hereof.

Moreover, this Summary is not intended to be limiting of the inventions or the claims (whether the currently presented claims or claims of a divisional/continuation application) and should not be interpreted in that manner. While certain embodiments have been described and/or outlined in this Summary, it should be understood that the present inventions are not limited to such embodiments, description and/or outline, nor are the claims limited in such a manner (which should also not be interpreted as being limited by this Summary).

Indeed, many other aspects, inventions and embodiments, which may be different from and/or similar to, the aspects, inventions and embodiments presented in this Summary, will be apparent from the description, illustrations and claims, which follow. In addition, although various features, attributes and advantages have been described in this Summary and/or are apparent in light thereof, it should be understood that such features, attributes and advantages are not required whether in one, some or all of the embodiments of the present inventions and, indeed, need not be present in any of the embodiments of the present inventions.

BRIEF DESCRIPTION OF THE DRAWINGS

In the course of the detailed description to follow, reference will be made to the attached drawings. These drawings show different aspects of the present inventions and, where appropriate, reference numerals illustrating like structures, components, materials and/or elements in different figures are labeled similarly. It is understood that various combinations of the structures, components, materials and/or elements, other than those specifically shown, are contemplated and are within the scope of the present inventions.

Moreover, there are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, many of those permutations and combinations will not be discussed and/or illustrated separately herein.

FIG. 1 is a schematic block diagram representation of video receiving circuitry, including video decoder circuitry according to at least certain aspects of the present inventions;

FIG. 2A is a schematic block diagram representation of video decoder circuitry according to at least certain aspects of the present inventions, wherein the video decoder circuitry, in this embodiment, includes luma/chroma processing circuitry which processes the video input by, among other things, separating the video input into separate chrominance and luminance signals;

FIG. 2B is a schematic block diagram representation of video decoder circuitry according to at least certain aspects of the present inventions, wherein the video decoder circuitry, in this embodiment, includes luma processing circuitry which processes the video input and outputs the luma data to the video processing circuitry according to at least certain aspects of the present inventions;

FIG. 3A is a schematic block diagram illustration of exemplary video receiver devices, according to any of the embodiments described and/or illustrated herein, to receive a video broadcast (for example, satellite, terrestrial and/or cable video transmission (for example, analog or digital TV broadcast)) from, for example, an electrically or optically conductive medium, according to at least certain aspects of certain embodiments of the present inventions;

FIGS. 3B-3D are schematic block diagram illustrations of exemplary video receiver devices, according to any of the embodiments described and/or illustrated herein, to receive a video broadcast (for example, satellite, terrestrial and/or cable video transmission (for example, analog or digital TV broadcast)), in conjunction with processor circuitry, a storage or recording device and/or a display, according to at least certain aspects of certain embodiments of the present inventions;

FIG. 5 is a block diagram representation of 3×3 matrix of pixels surrounding or encompassing the given data/pixel (pixel $x_i$, $y_i$) of the associated frame of pixels;

FIG. 9A is a block diagram representation of an original full-component video, wherein each pixel includes a luminance component and two chrominance components;

FIGS. 9B and 9C are block diagram representations of a standard subset of the original full-component video, for example, ITU-R BT.601 digital standard (wherein an active video line consists of 720 luminance samples and 360 chrominance samples per line; the color encoding system is generally known as YUV 4:2:2, that being the ratio of Y:Cb:Cr samples (luminance data:blue chroma data:red chroma data)—such that for a pair of pixels, the data are stored in the order Y1:Cb:Y2:Cr, with the chrominance samples co-sited with the first luminance sample 4:2:2);

FIG. 10A is employed (but only keeping luma (Y)), and in the even lines of a frame FIG. 10B is employed (keeping luma and chroma components);

FIGS. 11A and 11B are block diagram representations of data, including luminance and chrominance components of pixels, which may be stored in the buffer memory of the temporal adaptation circuitry of FIG. 8; notably, FIG. 11A shows "normal" factor-4 sub-sampling and FIG. 11B shows the implementation (compression) of 2-4 sub-sampling;

FIGS. 12A-12D are block diagram representations of exemplary embodiments of the reconstruction, decompression and/or up-sampling techniques, in accordance with an aspect of the present inventions, implemented by the 2-4 interpolation circuitry of the exemplary temporal adaptation circuitry of FIG. 8;

FIG. 14A is a schematic block diagram representation of the memory which stores scaling information ($\alpha_{input}$ and/or $\alpha_S$ and/or $\alpha_T$);

FIG. 14B is a schematic block diagram representation of adaptation correlation circuitry which generates scaling information ($\alpha_{input}$ and/or $\alpha_S$ and/or $\alpha_T$);

FIG. 14C is a schematic block diagram representation of exemplary adaptation correlation circuitry, according to at least certain aspects of the present inventions, wherein the adaptation correlation circuitry includes, among other things, signal integrity detection circuitry to measure the signal-to-noise ratio (SNR), signal strength and/or signal interference of, for example, the demodulated video signal; notably, this exemplary embodiment of the adaptation correlation circuitry may be implemented in any of the embodiments described and/or illustrated herein (for example, FIGS. 1A-3D and 15A-15C);

FIGS. 20A-20D are graphical illustrations of exemplary relationships between signal integrity (for example, the amount of signal to noise ratio (SNR) and/or signal interference) of, for example, the demodulated video signal and (i) the amount of scaling of the spatially adapted video data ($\alpha_S$) and/or (ii) the amount of scaling of the temporally adapted video data ($\alpha_T$) which are/is employed to generate video output data; notably, in these illustrative exemplary relationships, as the integrity of the signal decreases (for example, SNR decreases and/or signal interference increases), the scale factor for the spatially adapted video data ($\alpha_S$) and/or the scale factor for the temporally adapted video data ($\alpha_T$) increases; and correspondingly the scale factor for the video input data ($\alpha_{input}$) decreases.

Figure 3C:
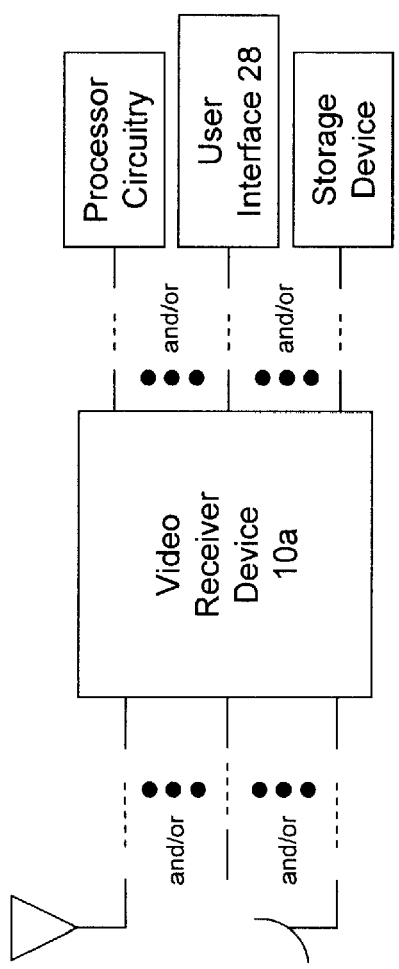

Again, there are many inventions described and illustrated herein. The present inventions are neither limited to any single aspect nor embodiment thereof, nor to any combinations and/or permutations of such aspects and/or embodiments. Each of the aspects of the present inventions, and/or embodiments thereof, may be employed alone or in combination with one or more of the other aspects of the present inventions and/or embodiments thereof. For the sake of brevity, many of those combinations and permutations are not discussed separately herein.

DETAILED DESCRIPTION

There are many inventions described and illustrated herein. In one aspect, the present inventions are directed to video processing circuitry and/or techniques to adaptively process video data to, for example, improve, modify and/or enhance video images recovered from a video broadcast (for example, satellite, terrestrial and/or cable video transmission (for example, analog or digital TV broadcast)). Such circuitry and/or techniques may address, reduce and/or minimize the adverse impact of noise (or the like) in/on the video data resulting from, produced or caused by, for example, signal interference or amplification of low power video signals. Indeed, such circuitry and/or techniques may increase sharpness and reduce motion smearing relative to conventional techniques.

In one embodiment, the video processing circuitry, which adaptively processes video data on a spatial and temporal basis, includes spatial adaptation circuitry, temporal adaptation circuitry and video manipulation circuitry. The spatial adaptation circuitry generates data which is a representation of one, some or all of the data/pixels of a line and/or frame of video based on or using one or more other data/pixels of the associated line and/or frame or one or more other data/pixels of a related line or frame (for example, provided in a feed-forward type architecture or configuration or provided in a feedback type configuration or architecture).

For example, in one exemplary embodiment, the spatial adaptation circuitry generates data/pixels of a frame (which may be an interlaced or non-interlaced frame, for example, a single field (composed of every other line of a frame of interlaced video), an entire interlaced frame (composed of two fields), and/or an entire progressive/non-interlaced frame (wherein the concept of a "field" has little relevance) of video based on or using spatially related and/or neighboring data/pixels (for example, averaging the pixel values of an N×M matrix surrounding/encompassing the given data/pixel, wherein N and M are, for example, equal to and/or greater than one—for example, a 3×3 matrix surrounding/encompassing the given data/pixel) of the associated frame. In this regard, the spatial adaptation circuitry generates data for each pixel of a frame using the data/values of the spatially related and/or neighboring pixels of the same or different frame. In this embodiment, the spatial adaptation circuitry may include a spatial defocus or blurring filter (for example, a Gaussian type filter) to thereby defocus or "blur" the sharpness of images represented in the video. Notably, all circuitry to, techniques and forms of spatially defocusing or blurring data/pixels of video data, whether now known or later developed, are intended to fall within the scope of the present inventions.

Notably, the spatial adaptation circuitry may process (i) the luminance data associated with each pixel, (ii) the chrominance data associated with each pixel, or (iii) the luminance and chrominance data associated with each pixel. All permutations and combinations thereof are intended to fall within the scope of the present inventions. In the context of black and white video, however, only luminance data associated with each pixel is generally available for processing.

The temporal adaptation circuitry stores data which is representative of one or more pixels or one or more lines or frames of video or one or more temporally preceding lines or frames (which may be an interlaced or non-interlaced frame) of video. For example, in one exemplary embodiment, the temporal adaptation circuitry stores data which is representative of the value of video data corresponding to the pixels of one or more temporally preceding frames (which may be an interlaced or non-interlaced frame). The data stored in memory may be representative of the value of video data corresponding to the pixel location of one or more preceding lines or frames. Thus, the temporal adaptation circuitry includes memory to store data which is temporally related to one or more preceding frames of the video output data and, in certain embodiments, is a temporal average of one or more preceding frames of the video output data. Such temporal average may be a temporal average of one or more preceding frames and the current frame of video output data.

Notably, the data stored in the memory may be a complete or full representation of the video output (i.e., a one to one map of each pixel locations—that is, a full/complete frame of data) or a fraction thereof (for example, a one half or one quarter representation). Where a fraction of a frame of video output is stored in the temporal adaptation circuitry, the temporal adaptation circuitry may employ down-sampling and/or compression techniques in conjunction with the video output. The temporal adaptation circuitry may employ any down-sampling and/or compression techniques now known or later developed. All down-sampling and/or compression techniques are intended to fall within the scope of the present inventions. However, as stated above, in another aspect, the present inventions also relate to circuitry and techniques for down-sampling and/or compressing of video data to, for example, store such data in memory. The down-sampling and/or compressing of video data in accordance with certain aspects of the present invention includes or presents smaller memory requirements, relative to certain conventional techniques, and may provide improved luminance sharpness, after up-sampling and/or decompressing, relative to such certain conventional techniques.

In certain embodiments where the temporal adaptation circuitry stores less than a full/complete frame of data, the temporal adaptation circuitry, in addition to storing video data, may also down-sample and/or compress the video data to, for example, accommodate the memory and/or memory constraints. In addition, under these circumstances, the temporal adaptation circuitry may generate video data corresponding to those pixel/data that were not maintained or stored in the stored in the temporal adaptation circuitry (for example, data that was "discarded" as a result of the down-sampling and/or compressing process) to, for example, output, include and/or provide a complete/full frame (which may be an interlaced or non-interlaced frame) of video. In this regard, the temporal adaptation circuitry generates data corresponding to certain pixels of a line or frame of video data based on or using data of one or more spatially related pixel locations (for example, neighboring pixels locations) of one or more corresponding or related lines or frames. Thus, in certain exemplary embodiments, the temporal adaptation circuitry, in addition to storing video data of pixels of one or more temporally preceding lines or frames of video, (i) down-sample or compress video data and (ii) up-sample or decompress video data to, for example, provide a complete/full frame (which may be an interlaced or non-interlaced frame) of video.

Indeed, in one embodiment, the temporal adaptation circuitry may generate data corresponding to the "discarded" or "un-stored" pixels values using interpolation circuitry and/or an interpolation technique (for example, calculating a particular pixel value based on or using an A×B matrix surrounding/encompassing the given data/pixel, wherein A and B are, for example, equal and greater than one—for example, a 3×3 matrix surrounding/encompassing the given pixel). The up-sampling and/or decompression technique implemented in the temporal adaptation circuitry may "reverse" the down-sampling and/or compression technique based on the same or different principle or technique as the down-sampling and/or compression technique and circuitry. All up-sampling and/or decompression techniques are intended to fall within the scope of the present inventions.

As intimated above, in another aspect, the present inventions also relate to circuitry and techniques for reading down-sampled and/or compressed video data from memory and thereafter, up-sampling or de-compressing such down-sampled and/or compressed video data to, for example, facilitate further processing the video data and, for example, to output and/or display the further processed video data.

Notably, similar to the spatial adaptation circuitry, the temporal adaptation circuitry may store/down-sample/up-sample (i) the luminance data associated with each pixel, (ii) the chrominance data associated with each pixel, or (iii) the luminance and chrominance data associated with each pixel. All permutations and combinations thereof are intended to fall within the scope of the present inventions. Indeed, in the context of black and white video, however, only luminance data associated with each pixel is available to store/down-sample/up-sample.

As mentioned above, the video processing circuitry also includes video manipulation circuitry. In one embodiment, the video manipulation circuitry generates video output data using the video input data (or a representation of such video input data) and the data output from the spatial adaptation circuitry and temporal adaptation circuitry (or a representations of such output data). In one embodiment, the video manipulation circuitry combines (for example, sums) the video input data with (i) the spatially adapted video data (i.e., video data which is a representation of one, some or all of the data/pixels of a line and/or frame of video based on or using one or more other data/pixels of the associated line and/or frame or one or more other data/pixels of a related line or frame, and (ii) the temporally adapted video data (i.e., video data which is representative of one or more temporally preceding lines or frames of video). In one embodiment, the video manipulation circuitry includes summation circuitry to "sum" or "add", on a pixel by pixel basis, the video input data (or a representation thereof, for example, a scaled version thereof—hereinafter collectively "video input data"), and the spatially adapted video data (or a representation thereof, for example, a scaled version thereof—hereinafter collectively "spatially adapted video data"), and the temporally adapted video data (or a representation thereof, for example, a scaled version thereof—hereinafter collectively "temporally adapted video data").

Notably, similar to the spatial adaptation circuitry and temporal adaptation circuitry, the video manipulation circuitry may generate video output data using (i) luminance data associated with each pixel, (ii) chrominance data associated with each pixel, or (iii) luminance and chrominance data associated with each pixel. All permutations and combinations thereof are intended to fall within the scope of the present inventions. As noted above, in the context of black and white video, only luminance data associated with each pixel is available for processing by the video manipulation circuitry.

The video manipulation circuitry may generate video output data using a representation of the video input data, and representations of the data outputs from the spatial adaptation circuitry and temporal adaptation circuitry. In one exemplary embodiment, the video processing circuitry includes one or more circuits to scale, amplify, weight, modify, increase or decrease, and/or adjust (hereinafter "scale" or the like, for example, "scaling" or "scaled") the video input data, the spatially adapted video data, and/or the temporally adapted video data prior to applying such data to the video manipulation circuitry. In this embodiment, the amount of scaling of the video input data, the spatially adapted video data, and/or the temporally adapted video data may be fixed or programmable, for example, one time programmable (for example, programmed during test or at manufacture) or more than one time programmable (for example, during test, start-up/power-up, during an initialization sequence and/or during operation of the video processing circuitry (for example, in situ)). In this regard, in one embodiment, the video processing circuitry may include memory to store the scaling information therein. For example, the video processing circuitry may include fuses or anti-fuses, or DRAM, SRAM, ROM, PROM, EPROM, EEPROM and/or Flash memory cells, to store data which is representative of the amount of scaling for use by the scaling circuitry.

For example, in one embodiment, the amount of scaling incorporated or implemented by the scaling circuits associated with each of the video input data, the spatially adapted video data, and/or the temporally adapted video data may be stored in one or more registers. In this embodiment, the amount of scaling may be provided to the particular scaling circuits, for example, at start-up/power-up, during an initialization sequence, by external broadcast circuitry and/or in response to one or more user or operator instructions or inputs. Indeed, in one embodiment, the amount of scaling is determined at start-up/power-up, during an initialization sequence, by external broadcast circuitry and/or in response to user or operator instructions based on information which is representative of the geographic region and/or the video standard (for example, NTSC, PAL, SECAM or DVB-T) in which the device is operated) and thereafter such scaling information is provided to the scaling circuits associated with video input data, and/or data outputs from the spatial adaptation circuitry and/or temporal adaptation circuitry.

Notably, the memory (for example, register) may be a permanent, semi-permanent or temporary (i.e., until re-programmed) storage; for example, a DRAM, SRAM, ROM, PROM, EPROM, EEPROM and/or Flash memory cells that are resident on (i.e., integrated in) the interface circuitry, device or system, or external thereto (i.e., not integrated in). Indeed, the scaling information for the video input data, the spatial adapted data and/or temporal adapted data (whether in a relative or absolute manner) may be defined via a particular fixed configuration of the state of switch(es) or certain pin(s) on the package of the device (which may be, for example, defined or established during manufacturing). All circuitry and techniques of (i) storing scaling information and/or (ii) programming the scaling circuits during before or during operation are intended to fall within the scope of the present invention.

In another embodiment, the amount of scaling may be determined, calculated and/or provided by adaptation correlation circuitry which determines or calculates the amount of scaling for the spatially adapted video data and/or the temporally adapted video data. In this exemplary embodiment, the adaptation correlation circuitry may determine such scaling based on or using spatially adapted video data and/or the temporally adapted video data. Moreover, although the adaptation correlation circuitry determines or calculates the amount of scaling for the spatially adapted video data and the temporally adapted video data, the amount of scaling of the video input data may be fixed or predetermined, relative to the amount of scaling of the spatially adapted video data and/or the temporally adapted video data, for example, at start-up/power-up, during an initialization sequence, by external broadcast circuitry and/or in response to one or more user or operator instructions or inputs.

In one embodiment, the adaptation correlation circuitry determines or calculates the amount of scaling for the spatially adapted video data and the temporally adapted video data based on an amount of "motion" in the video. In this embodiment, the amount of scaling of the video input signal may be fixed, predetermined and/or determined during operation of the video processing circuitry (in situ)—for example, relative to the amount of scaling of the spatially adapted video data and the temporally adapted video data. In one embodiment, the adaptation correlation circuitry may include motion detection circuitry to, in one embodiment, compare corresponding pixel values of the spatially adapted video data and the temporally adapted video data to determine "differences" there between; and based thereon assess or determine whether there is "motion" in the video. Indeed, in certain embodiments, the adaptation correlation circuitry may determine, assess or calculate the amount or extent of "motion" in the video. The adaptation correlation circuitry, based on the assessment or determination of motion (and, in certain embodiments, the amount or extent of such motion) calculates or determines the amount of scaling for the spatially adapted video data and the temporally adapted video data. In response, the adaptation correlation circuitry generates signals which are representative of the amount of scaling and provides or applies such signals to the associated scaling circuits.

Notably, in those embodiments where the adaptation correlation circuitry employs the amount or extent of "motion" in video to calculate or determine the amount of scaling for the spatially adapted video data and the temporally adapted video data, where there is relatively significant motion, the adaptation correlation circuitry may increase the impact of the spatially adapted video data relative to the temporally adapted video data by applying an amount of scaling to the circuits that causes an increase in the spatially adapted video data relative to the temporally adapted video data. In contrast, where the amount or extent of motion is determined to be relatively insignificant, the adaptation correlation circuitry increases the impact of the temporally adapted video data relative to the spatially adapted video data by applying an amount of scaling to the circuits that causes an increase in the temporally adapted video data relative to the spatially adapted video data. Thus, in these embodiments, the adaptation correlation circuitry determines and incorporates an amount of scaling of the spatially adapted video data relative to an amount of scaling of the temporally adapted video data based on an amount of "motion" detected or determined (by the adaptation correlation circuitry, for example, based on an analysis of the video input data).

In another embodiment, the motion detection circuitry may compare corresponding pixel values of the video input data to the temporally adapted video data to determine "differences" there between; and based thereon assess or determine whether there is "motion" in the video and, in certain embodiments, the motion detection circuitry may assess, determine and/or calculate the amount or extent of motion in the video. In the same manner as described immediately above, the adaptation correlation circuitry, based on the assessment of motion and the amount of such motion, determines or calculates the amount of scaling for the spatially adapted video data and the temporally adapted video data. In response, the adaptation correlation circuitry generates signals which are representative of the amount of scaling and provides or applies such signals to the scaling circuits. In this way, the impact of the outputs of such adaptation circuitry on the video input data may be controlled, adjusted, adapted and/or modified (in situ) according to the images in the video.

Notably, the circuitry and/or circuits of the video processing circuitry (for example, the spatial adaptation circuitry, temporal adaptation circuitry, adaptation correlation circuitry and/or scaling circuits (or portions thereof)) may be integrated or may be implemented using a plurality of discrete logic, passive elements and/or active elements, and/or a state machine, a special or general purpose processor (suitably programmed) and/or a field programmable gate array (or combinations thereof). Indeed, all permutations and/or combinations of integrated, discrete, hardwired and programmable circuitry (which is programmed, for example, via software) for implementing the video processing circuitry (or portions thereof) are intended to fall within the scope of the present inventions.

The spatial adaptation circuitry, temporal adaptation circuitry, adaptation correlation circuitry and/or scaling circuits may also share circuitry with each other as well as with other elements of the video receiver device, video receiving circuitry and/or video processing circuitry. Moreover, the circuitry of the spatial adaptation circuitry, temporal adaptation circuitry, adaptation correlation circuitry and/or scaling circuits (or components thereof) may also perform one or more other operations, which may be separate and distinct from that described herein.

As noted above, the present inventions may be employed in conjunction with any analog or digital broadcast transmission regime and video standard (for example, NTSC, PAL, SECAM, ATSC or DVB-T) whether now known or later developed. Moreover, the circuitry according to the present inventions may output video data in accordance with any video data output standard (for example, standard RGB video output standard—whether in, for example, NTSC, PAL or SECAM analog standards or ATSC, ISDB, DVB, or ITU-R BT.601 digital standards), whether now known or later developed; all of which, when adaptively processed in accordance with or using the present inventions, are intended to fall within the scope of the present inventions.

Moreover, as intimated above, although not illustrated, the video processing circuitry, video receiving circuitry and/or video receiver device may also include output format circuitry to format and output a predetermined or fixed amount of video output data, output display synchronization or timing signals (for example, horizontal synchronization signals, vertical synchronization signals) and/or timing markers or tags (for example, start of active video data and end of active video data) to, for example, a video display. For the sake of brevity, the output format circuitry will not be discussed in detail. It should be noted, however that any output format circuitry whether now known or later developed may be implemented in conjunction with any of the embodiments of the present inventions.

With reference to FIG. 1, in one exemplary embodiment, the present inventions are directed to a video receiving circuitry 10, for example, circuitry of a mobile TV, which recovers video signals from a video broadcast (for example, satellite, terrestrial and/or cable video transmission (for example, analog or digital TV broadcast)). In this exemplary embodiment, video receiving circuitry 10 includes tuner circuitry 12, baseband processing circuitry 14 and video decoder circuitry 16. Briefly, tuner circuitry 12, in one exemplary embodiment, responsively tunes video receiving circuitry 10 to, for example, one or more user selected channels of a frequency band, converts a received RF signal to a baseband video signal and outputs a baseband video signal to baseband processing circuitry 14. The tuner circuitry 12 (which may include channel decoder circuitry) may, among other things, responsively acquire one or more channels (for example, one or more channels which are associated with one or more of the user selected channels).

With continued reference to FIG. 1, baseband processing circuitry 14, in one exemplary embodiment, digitizes the baseband video signal and converts the digitized data stream to video image data. In this regard, baseband processing circuitry 14 may include analog-to-digital converter circuitry, in conjunction with one or more clock signals generated by clock generation circuitry, to digitize the baseband video signal and provide the digitized data stream to video decoder circuitry 16. The video decoder circuitry 16 further processes the digitized data by converting the digitized data, which is representative of the baseband video signal, to video image data.

Notably, the present inventions may be implemented in conjunction with any type of tuner circuitry and/or baseband processing circuitry (including digital and/or analog circuitry, passive and/or active elements, discrete and/or integrated devices), whether now known or later developed. All such tuner circuitry and baseband processing circuitry are intended to fall within the scope of the present inventions.

With reference to FIG. 2A, in one exemplary embodiment, video decoder circuitry 16 includes luma/chroma processing circuitry 18 to process the (digitized) input video signal. The luma/chroma processing circuitry 18 may include Y/C separation circuitry 20, luma processing circuitry 22 and chroma processing circuitry 24 which generate and output separate chroma and luma signals to video processing circuitry 26. The video decoder circuitry 16, in one embodiment, implements the video decoding operation to provide, for example, standard RGB video output signals in, for example, NTSC, PAL or SECAM analog standards and/or ATSC, ISDB, DVB, or ITU-R BT.601 digital standards; all such formats and standards are intended to fall within the scope of the present inventions.

With reference to FIG. 2B, in another exemplary embodiment, video decoder circuitry 16 includes luma processing circuitry 18 to process the (digitized) input video signal, and generate and output luma signals to video processing circuitry 26. Again, video decoder circuitry 16 may generate and output video signals in accordance with any format or standard, for example, standard BAN video output signals in, for example, NTSC, PAL or SECAM analog standards and/or ATSC, ISDB, HDTV, DVB, or ITU-R BT.601 digital standards; all such formats and standards are intended to fall within the scope of the present inventions.

As mentioned above, the present inventions may be employed in a satellite, terrestrial and/or cable communications environments (among others) which implements video decoder circuitry. (See, for example, FIG. 3A). For example, the present inventions may be implemented in a satellite, terrestrial and/or cable digital television environment and/or receiver (for example, digital broadcasting TV receiver, for example, mobile TV receiver). Moreover, video receiving circuitry 10 may output data to user interface 28 (which includes a video display) and/or processor circuitry, video display and/or video storage or recording device. (See, for example, FIGS. 3B-3F). Such devices may be integrated in or external from video receiver device 10a. (See, for example, FIGS. 3C and 3D); all permutations and combinations of integrated and external configurations are intended to fall within the scope of the present inventions.

Notably, as mentioned above, although not illustrated, video receiving circuitry 10, video receiver device 10a and/or video processing circuitry 26 may include output format circuitry to format and output a predetermined or fixed amount of video data, output display synchronization or timing signals (for example, horizontal synchronization signals, vertical synchronization signals) and/or timing markers or tags (for example, start of active video data and end of active video data) to, for example, a video display (for example, of a user interface 28. (See, for example, FIGS. 3C and 3D). For the sake of brevity, the output format circuitry will not be discussed in detail. It should be noted, however that any output format circuitry whether now known or later developed may be implemented in conjunction with any of the embodiments of the present inventions.

Figure 4A:
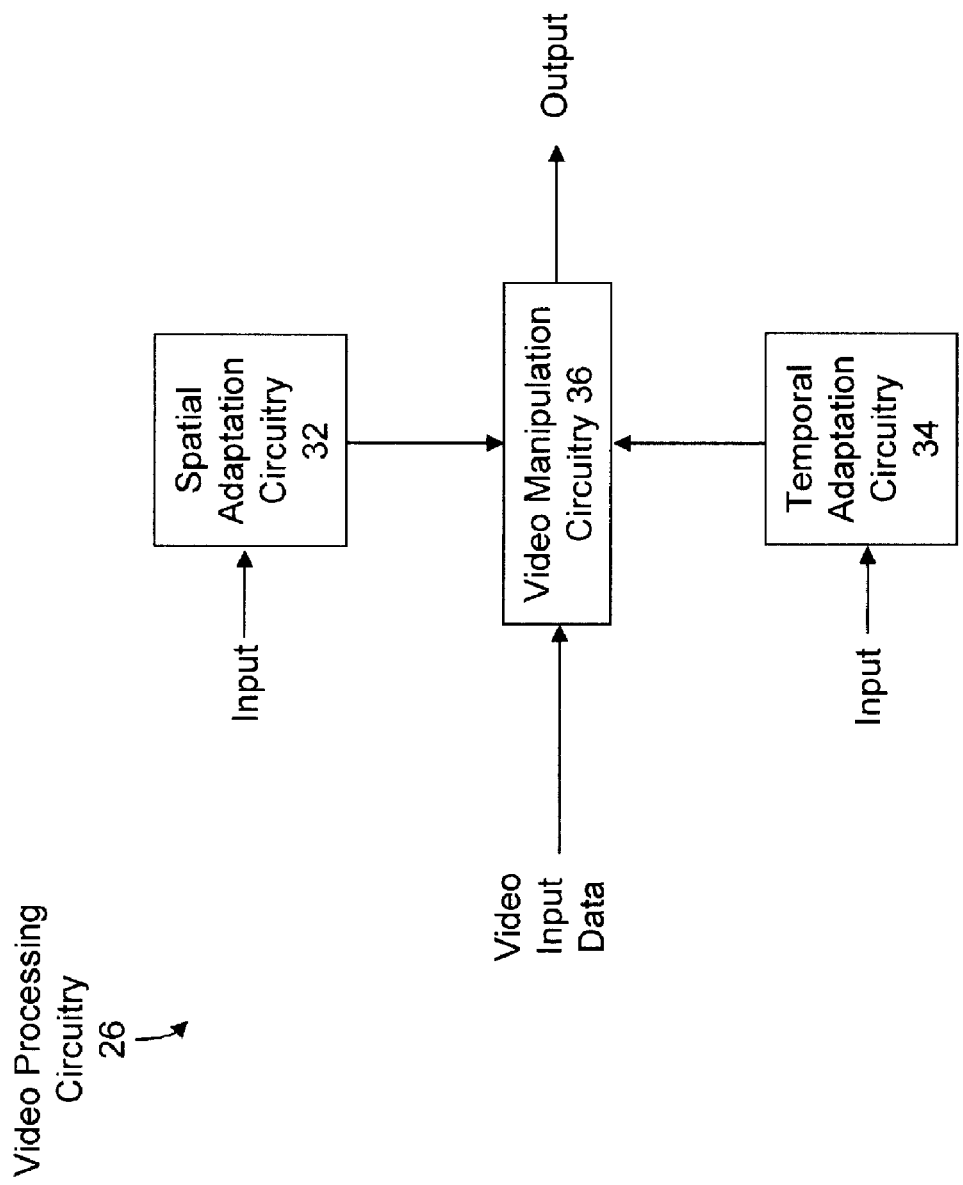
FIGS. 4A-4C are schematic block diagram representations of exemplary video processing circuitry, according to at least certain aspects of the present inventions, wherein the video processing circuitry of this exemplary embodiment includes spatial adaptation circuitry and temporal adaptation circuitry, wherein the spatial adaptation circuitry may be configured in a (i) feedback type architecture (FIG. 4B) such that the spatial adaptation circuitry generates data which is a representation of one, some or all of the data/pixels of a line and/or frame of video based on or using one or more other data/pixels of a line or frame that are further processed by video manipulation circuitry or (ii) a feed-forward type architecture (FIG. 4C) such that the spatial adaptation circuitry generates data which is a representation of one, some or all of the data/pixels of a line and/or frame of video based on or using one or more other data/pixels of a line or frame that are not processed by video manipulation circuitry; notably, these exemplary embodiments of the video processing circuitry may be implemented in any of the embodiments of the video receiving circuitry and/or video receiver device described and/or illustrated herein (see, for example, FIGS. 1A-3D)
Figure 4B:
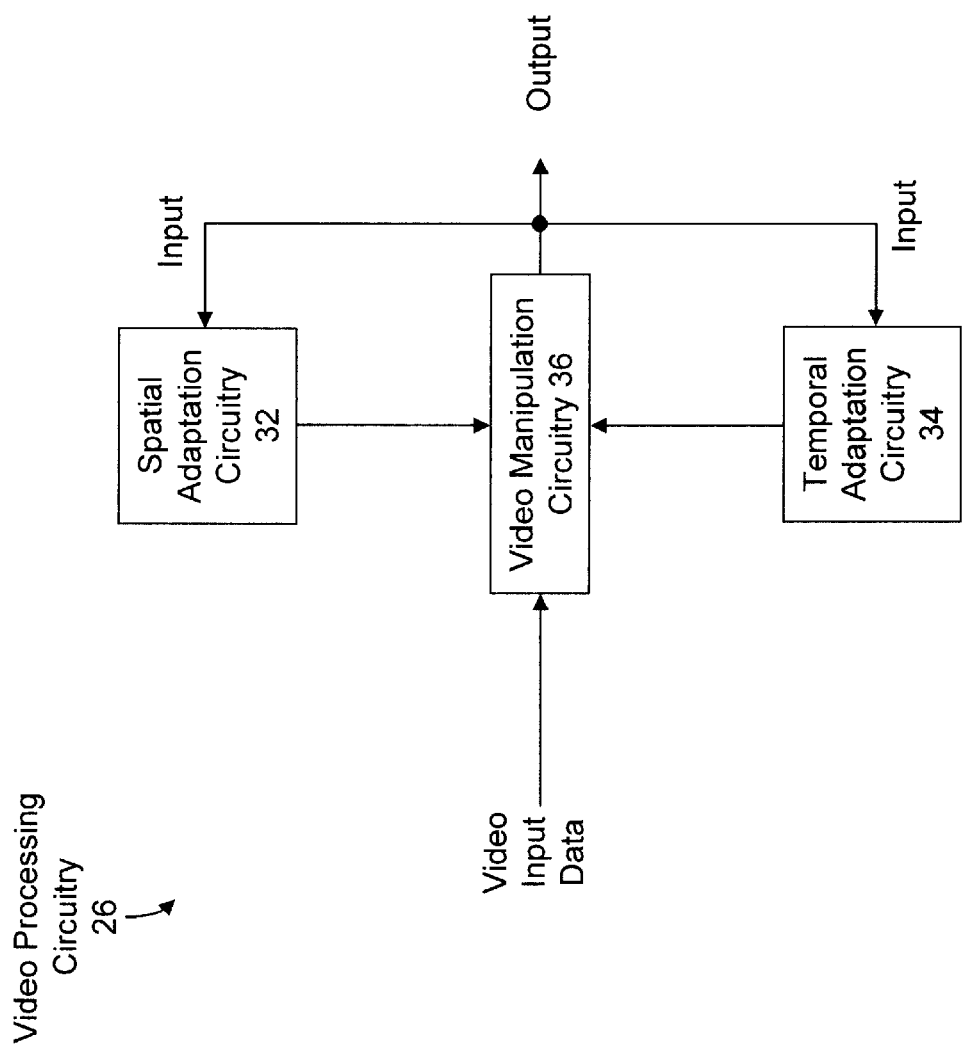
Figure 4C:
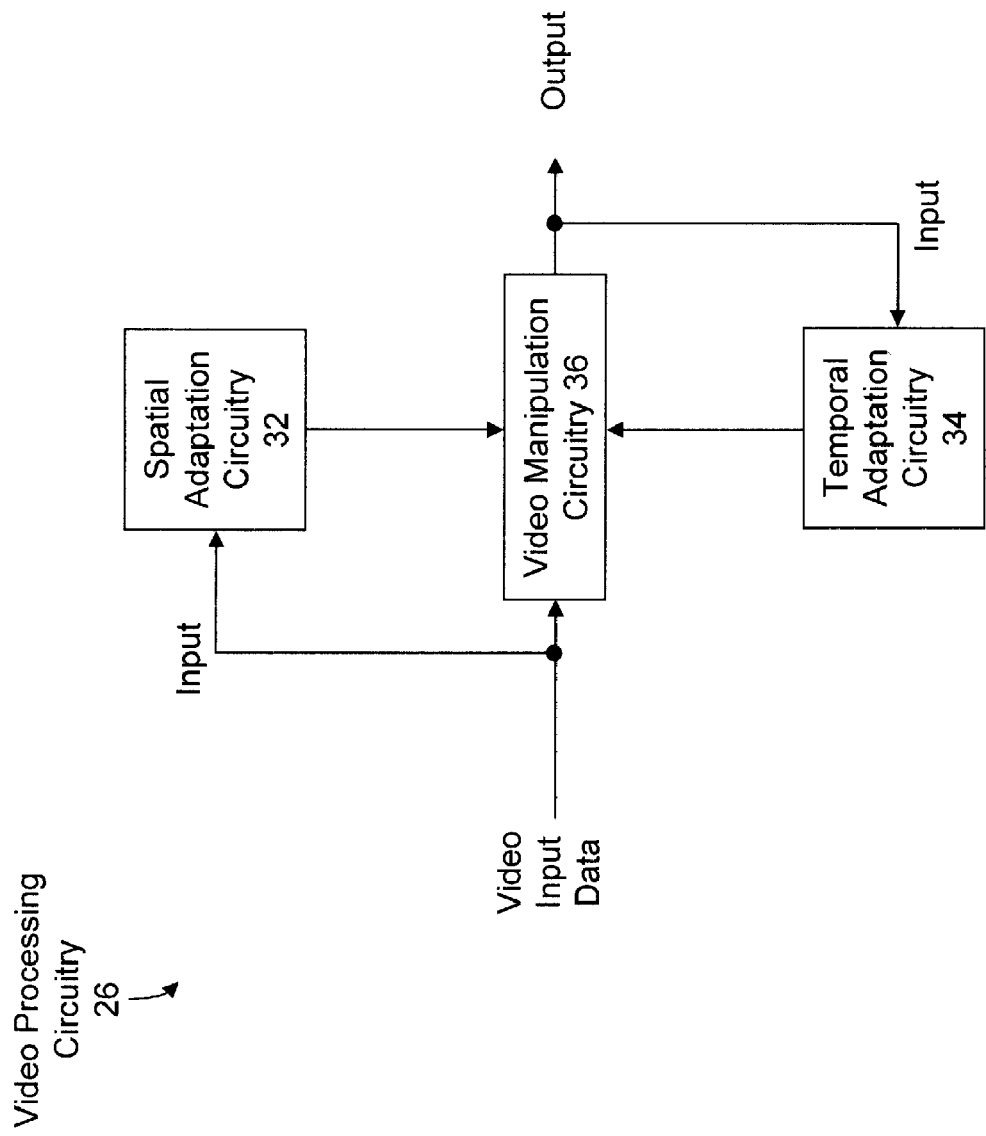
Figure 4D:
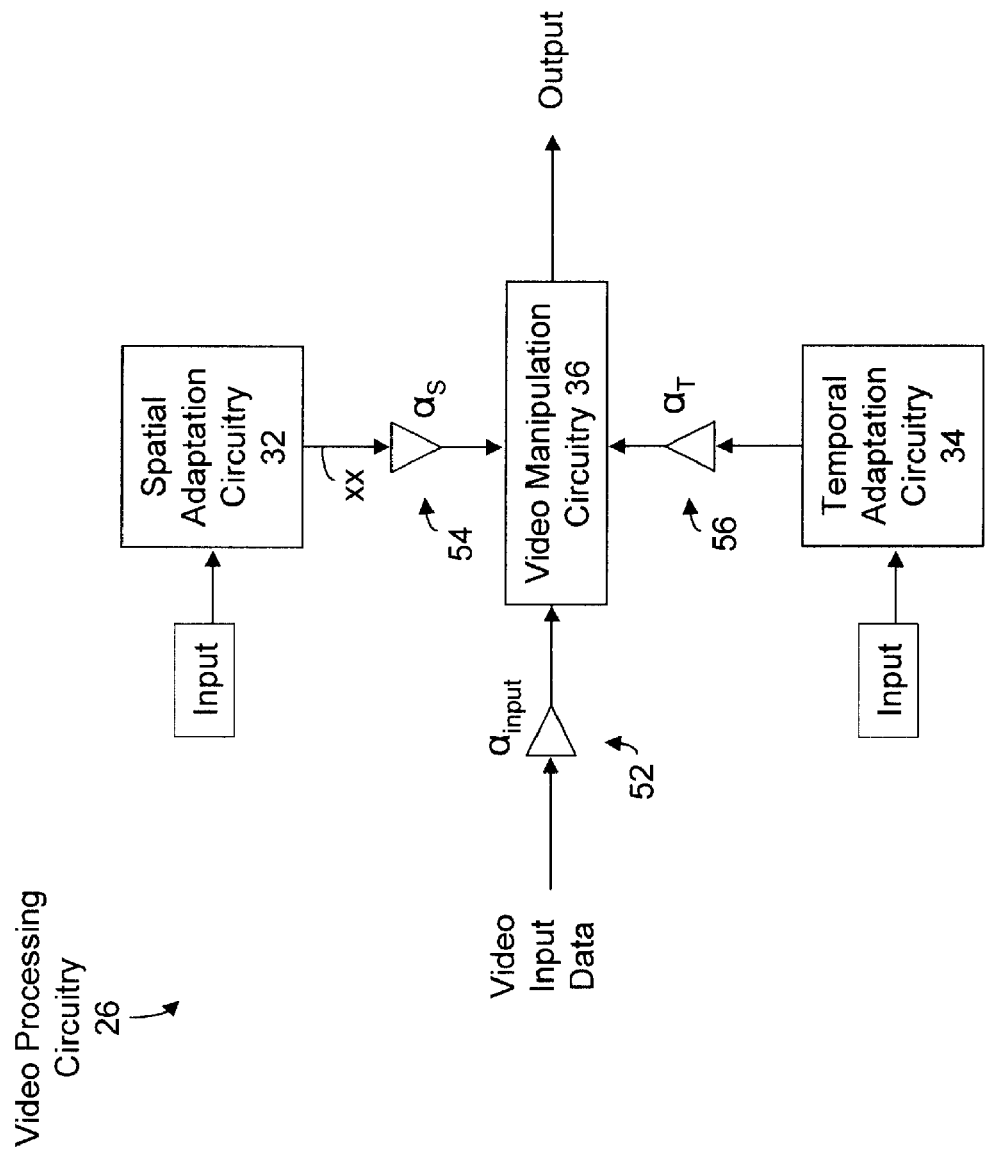
FIG. 4D is a schematic block diagram representation of exemplary video processing circuitry, according to at least certain aspects of the present inventions, wherein the video processing circuitry of this exemplary embodiment includes spatial adaptation circuitry and temporal adaptation circuitry whose outputs may be scaled, amplified, weighted, modified and/or adjusted ($\alpha_S$ and $\alpha_S$) to thereby control the impact of the outputs of such adaptation circuitry on the video input data; notably, the exemplary embodiment of the video processing circuitry may be implemented in any of the embodiments of the video receiving circuitry and/or video receiver device described and/or illustrated herein (see, for example, FIGS. 1A-3D); moreover, the exemplary embodiment of the video processing circuitry may be implemented in any architecture described and/or illustrated herein (for example, a feedback type architecture (FIG. 4B) or a feed-forward/feedback type architecture (FIG. 4C))

With reference to FIGS. 4A-4C, in one exemplary embodiment, video processing circuitry 26 adaptively processes video data on a spatial and temporal basis. The video processing circuitry 26 includes spatial adaptation circuitry 32, temporal adaptation circuitry 34 and video manipulation circuitry 36. The spatial adaptation circuitry 32 generates data which is a representation of one, some or all of the data/pixels of a line and/or frame of video based on or using one or more other data/pixels of the associated line and/or frame or one or more other data/pixels of a related line or frame. The related line or frame may be, for example, a line or frame of data in a feedback type architecture or configuration wherein the data of the related line or frame is processed by video manipulation circuitry 36 (see, for example, FIG. 4B), or a line or frame in a feed-forward type configuration or architecture wherein the data of the related line or frame is not processed by video manipulation circuitry 36 (see, for example, FIG. 4C).

In one exemplary embodiment, spatial adaptation circuitry 32 generates data/pixels of a frame (which may be an interlaced or non-interlaced frame) of video based on or using spatially related and/or neighboring data/pixels. The spatial adaptation circuitry 32, in one embodiment, may average the pixel values of an N×M matrix surrounding or encompassing each data/pixel, wherein N and M are, for example, equal and greater than one, and in a preferred embodiment, for example, a 3×3 matrix surrounding or encompassing the given data/pixel of the associated frame. (See, FIG. 5). In this regard, spatial adaptation circuitry 32 generates data for each pixel of a frame using the data/values of the spatially related and/or neighboring pixels of the same or different frame.

Figure 6A:
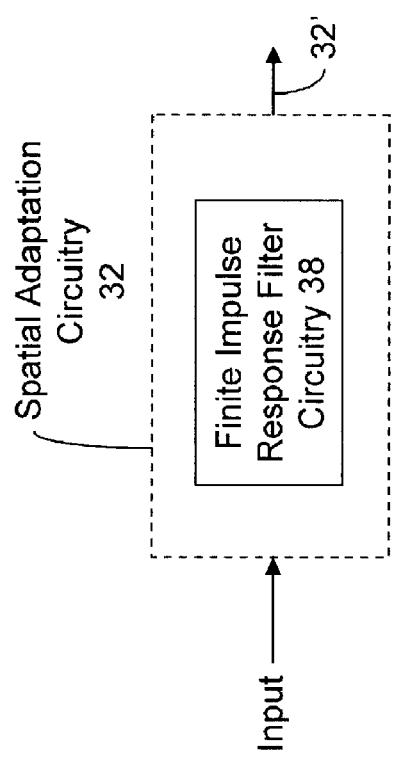
FIGS. 6A and 6B are schematic block diagram representations of exemplary spatial adaptation circuitry, according to at least certain aspects of the present inventions; notably, these exemplary embodiments of the spatial adaptation circuitry may be implemented in any of the embodiments described and/or illustrated herein (for example, FIGS. 4A-4D, 13A-13C and 15A-15C)
Figure 6B:
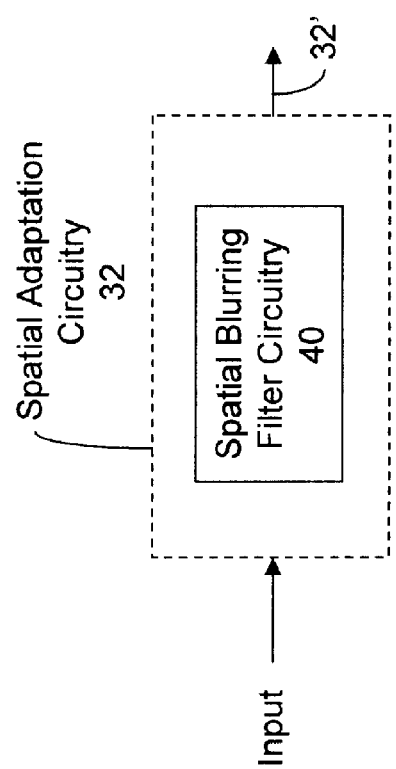

In one embodiment, spatial adaptation circuitry 32 includes a finite impulse response filter circuitry to generate data for each pixel of a frame using the data/values of the spatially related and/or neighboring pixels. (See, FIG. 6A). In another embodiment, spatial adaptation circuitry 32 includes a spatial defocus or blurring filter circuitry 40 (for example, a Gaussian type filter, Hamming window type filter or a triangle type or a rectangle/uniform type filter) to apply data/values of the pixels of the frame to defocus or "blur" the images represented in the video. (See, FIG. 6B). In one embodiment, the spatial defocus or blurring filter circuitry 40 may include a rectangle filter averaging the pixel values in a 2×7 matrix where the two indicates the current and previous row, and the seven indicates the three previous columns, the current column, and the three subsequent columns.

Notably, all circuitry to, techniques and forms of spatially defocusing or blurring data/pixels of video data, whether now known or later developed, may be implemented in spatial adaptation circuitry 32. Indeed, all circuitry to, techniques and forms of spatially defocusing or blurring data/pixels of video data, whether now known or later developed are intended to fall within the scope of the present inventions.

The spatial adaptation circuitry 32, for example, may average (i) the luminance data associated with each pixel, (ii) the chrominance data associated with each pixel, or (iii) the luminance and chrominance data associated with each pixel. In one particular embodiment, spatial adaptation circuitry averages the luminance values of an N×M matrix of pixels (for example, 3×3 or 6×6) neighboring, surrounding and/or encompassing the pixels. Where the pixel under consideration is at or near an "edge" of the video, spatial adaptation circuitry 32 may average the luminance vales of a smaller matrix (wherein the pixel under consideration is not surrounded by or centered in the matrix).

Alternatively, where the pixel under consideration is at or near an "edge" of the video, spatial adaptation circuitry 32 may not average the luminance of the "edge" pixels—but rather use the actual/measured luminance value of the pixel under consideration. In yet another alternative, where the pixel under consideration is at or near an "edge" of the video, spatial adaptation circuitry 32 may average the luminance vales of the matrix using luminance values of pixels that are not typically "displayed" due to the "screen" size (such values/data is/are output during a blanking interval). Notably, in this embodiment, spatial adaptation circuitry 32 disregards the chrominance data associated with each pixel. This notwithstanding, all permutations and combinations thereof are intended to fall within the scope of the present inventions.

Figure 7A:
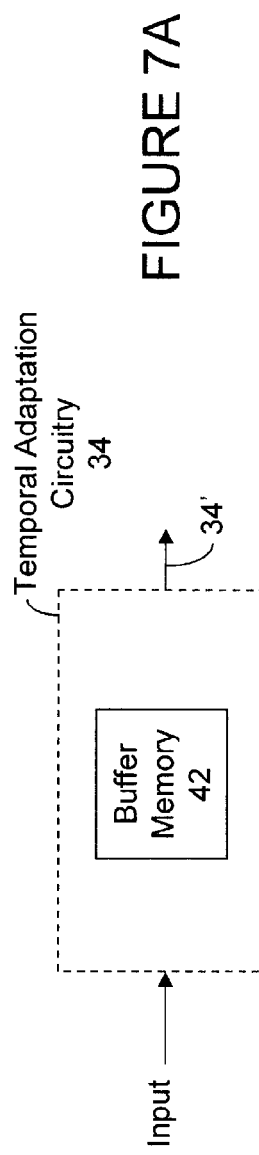
FIGS. 7A and 7B are schematic block diagram representations of exemplary temporal adaptation circuitry, according to at least certain aspects of the present inventions; notably, these exemplary embodiments of the temporal adaptation circuitry may be implemented in any of the embodiments described and/or illustrated herein (for example, FIGS. 4A-4D, 13A-13C and 15A-15C)

With reference to FIGS. 4A-4C, in one embodiment, temporal adaptation circuitry 34 stores data which is representative of one or more pixels of one or more lines or frames of video of one or more temporally preceding lines or frames of video (which may be an interlaced or non-interlaced frame). For example, with reference to FIG. 7A, in one exemplary embodiment, temporal adaptation circuitry 34 includes buffer memory 42 to store data which is representative of the value of video data corresponding to or representative of the pixels of one or more temporally preceding frames (which may be a full or fractional frame and/or interlaced or non-interlaced). The data stored in buffer memory 42 may be representative of the value of video data corresponding to the pixel location of one or more preceding lines or frames. Indeed, buffer memory 42 of temporal adaptation circuitry 34 may store data which is a temporally related to one or more preceding frames of the video output data, for example, a temporal average of one or more preceding frames of the video output data. In certain embodiments, such data is averaged with the current frame of video output data.

Figure 7B:
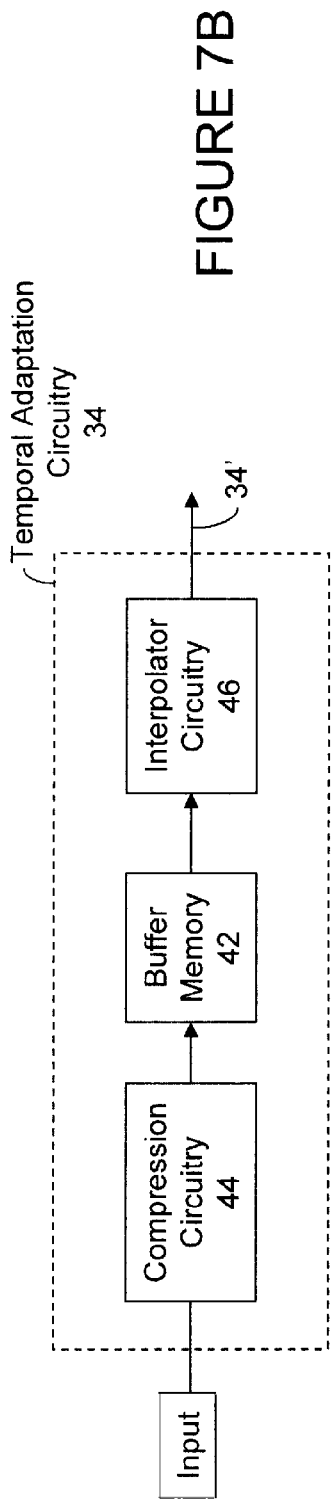

The data stored in buffer memory 42 may be a complete or full representation of a frame of video output (i.e., a one to one map of each pixel locations—that is, a full/complete frame of data) or a fraction thereof (for example, a one half or one quarter representation). Where a fraction of a frame of video output is stored in buffer memory 42, temporal adaptation circuitry 34 may include compression circuitry 44 to down-sample and/or compress the data (corresponding to a frame of video output data or temporal average of one or more preceding frames of the video output data of data) to store the down-sampled data in buffer memory 42. (See, FIG. 7B). Under these circumstances, in addition to compression circuitry 44, temporal adaptation circuitry 34 may include interpolator circuitry 46 to up-sample or decompress video data to, for example, provide a complete/full frame (which may be an interlaced or non-interlaced frame) of video. (See, FIG. 7B).

Notably, all down-sampling and/or compression circuitry and techniques as well as up-sampling and/or decompression circuitry and techniques are intended to fall within the scope of the present inventions. For example, where temporal adaptation circuitry 34 stores less than a full/complete frame of data, temporal adaptation circuitry 34 generates data corresponding to certain pixels of a line or frame of video data based on or using data of one or more spatially related pixel locations (for example, neighboring pixels locations) of one or more corresponding or related lines or frames. In one exemplary embodiment, temporal adaptation circuitry 34 may generate data corresponding to the "discarded" or "unstored" pixels values (whether luminance and/or chrominance related data for that pixel) using interpolation circuitry and/or an interpolation technique (for example, calculating a particular pixel value based on or using an A×B matrix surrounding/encompassing the given data/pixel, wherein A and B are, for example, equal and/or greater than one—for example, a 3×3 matrix surrounding/encompassing the given pixel). Thus, in certain exemplary embodiments, temporal adaptation circuitry 34, in addition to storing video data of pixels of one or more temporally preceding lines or frames of video, (i) down-sample or compress video data and (ii) up-sample or decompress video data to, for example, provide a complete/full frame (which may be an interlaced or non-interlaced frame) of video.

Notably, similar to spatial adaptation circuitry 32, temporal adaptation circuitry 34 may store/down-sample/up-sample (i) the luminance data associated with each pixel, (ii) the chrominance data associated with each pixel, or (iii) the luminance and chrominance data associated with each pixel. All permutations and combinations thereof are intended to fall within the scope of the present inventions. Indeed, in the context of black and white video, however, only luminance data associated with each pixel is available to store/down-sample/up-sample.

As indicated above, in another aspect, the present inventions also relate to circuitry and techniques for down-sampling video data to, for example, store such data in memory. The down-sampling and/or compressing of video data in accordance with certain aspects of the present invention requires smaller memory requirements, relative to certain conventional techniques, and may provide improved luminance sharpness, after up-sampling and/or decompressing, relative to such certain techniques.

Figure 8:
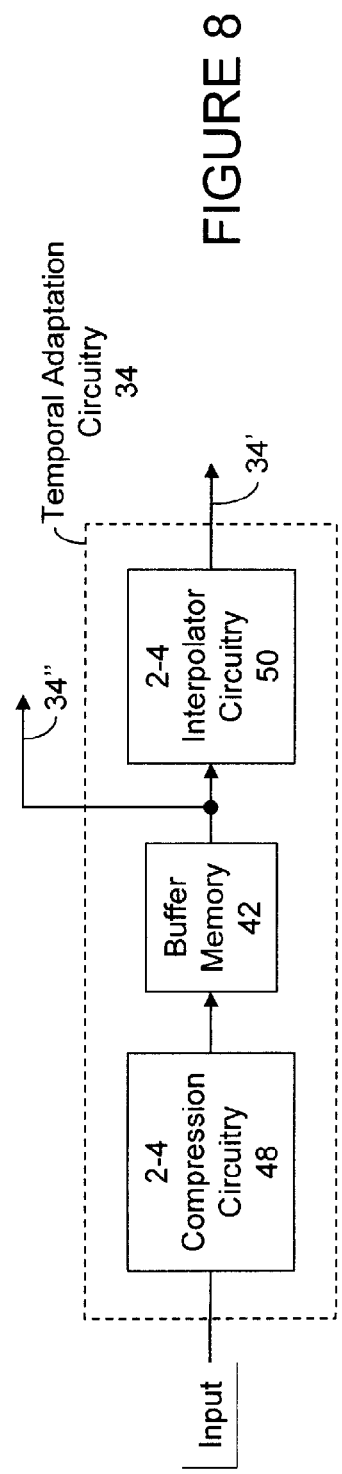
FIG. 8 is schematic block diagram representations of exemplary temporal adaptation circuitry, in accordance with an aspect of the present inventions, wherein the temporal adaptation circuitry includes 2-4 compression circuitry and 2-4 interpolation circuitry to down-sample and up-sample, respectively; notably, these exemplary embodiments of the temporal adaptation circuitry may be implemented in any of the embodiments described and/or illustrated herein (for example, FIGS. 4A-4D, 13A-13C and 15A-15C)

With reference to FIG. 8, in one embodiment of this aspect of the present inventions, temporal adaptation circuitry 34 includes 2-4 compression circuitry 48, buffer memory 42 and 2-4 interpolator circuitry 50. In this embodiment, 2-4 compression circuitry 48 may receive output video data (for example, original full-component video or a standard subset thereof, for example, ITU-R BT.601 digital standard (wherein an active video line consists of 720 luminance samples and 360 chrominance samples per line; the color encoding system is generally known as YUV 4:2:2, that being the ratio of Y:Cb:Cr samples (luminance data:blue chroma data:red chroma data)—such that for a pair of pixels, the data are stored in the order Y1:Cb:Y2:Cr, with the chrominance samples co-sited with the first luminance sample 4:2:2). (See, FIGS. 9A and 9B). Under these circumstances, under conventional techniques, where buffer memory 42 stores a full-field or frame of the 4:2:2 video standard, for each pixel or location, memory buffer 42 stores two components of data, namely a luminance component and one of the two chrominance components. (See, FIG. 9C).

Figure 10A:
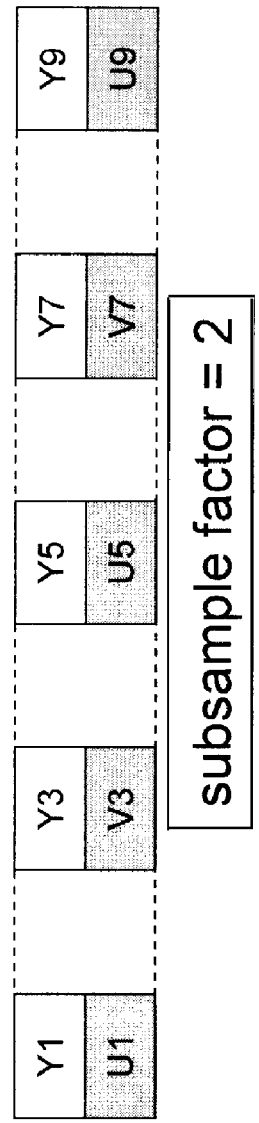
FIGS. 10A and 10B are block diagram representations of exemplary embodiments of the compression or down-sampling techniques implemented by the 2-4 compression circuitry of the exemplary temporal adaptation circuitry of FIG. 8; notably, the circuitry of FIG. 8 may employ a hybrid or variant of FIGS. 10A and 10B wherein, in the odd lines of a frame.
Figure 10B:
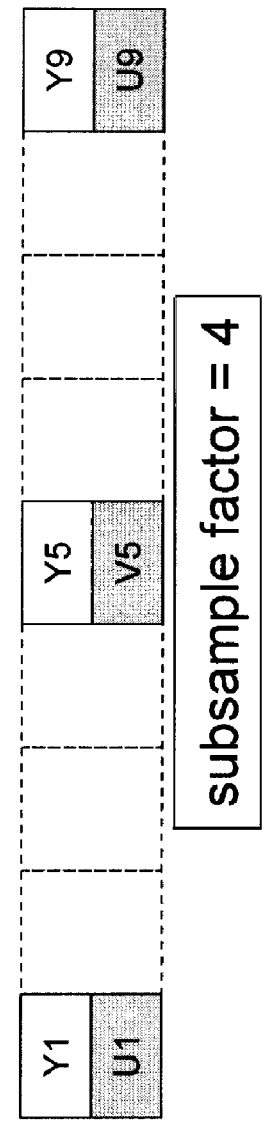

With reference to FIG. 10A, in one embodiment of this aspect of the present inventions, 2-4 compression circuitry 48 down-samples full-field or frame of the 4:2:2 video standard by generating chrominance component V3 by averaging the neighboring similar chrominance components (i.e., V2 and V4). Alternatively, 2-4 compression circuitry 48 may generate chrominance component V3 by substituting one of the neighboring chrominance pixel values (for example, V2 or V4). The 2-4 compression circuitry 48 may apply this compression or down-sampling process/technique to the entire data field. Moreover, 2-4 compression circuitry 48 may discard alternate luma components (for example, luminance component Y2, Y4, . . . ).

In the event that additional compression or down-sampling is desired, 2-4 compression circuitry 48 may further compress or down-sample the data by generating chrominance component V5 by averaging the neighboring similar chrominance components (for example, averaging V4 and V6, or averaging V2, V4, V6 and V8 (see FIG. 9C)), or generating chrominance component V5 by substituting one of the neighboring similar chrominance pixel values (for example, V2 or V4). Again, 2-4 compression circuitry 48 applies this compression or down-sampling process/technique to the entire data field. Moreover, 2-4 compression circuitry 48 may again discard the remaining alternate luminance components (for example, luminance component Y3, Y7, etc.) A representation of the data stored in memory 42 is illustrated in FIG. 11A.

Notably, in those embodiments where the output video is interlaced, 2-4 compression circuitry 48 may discard the color components of pixels for alternating lines of video and generate alternate luminance components for such lines. (See, FIG. 11B). Thus, in this particular exemplary embodiment, 2-4 compression circuitry 48 employs the additional space provided by discarding the color components of pixels for alternating lines of video by generating and/or storing additional luminance (Y) samples. In this way, the luminance sharpness may be enhanced or increased.

Figures 12A, 12B:
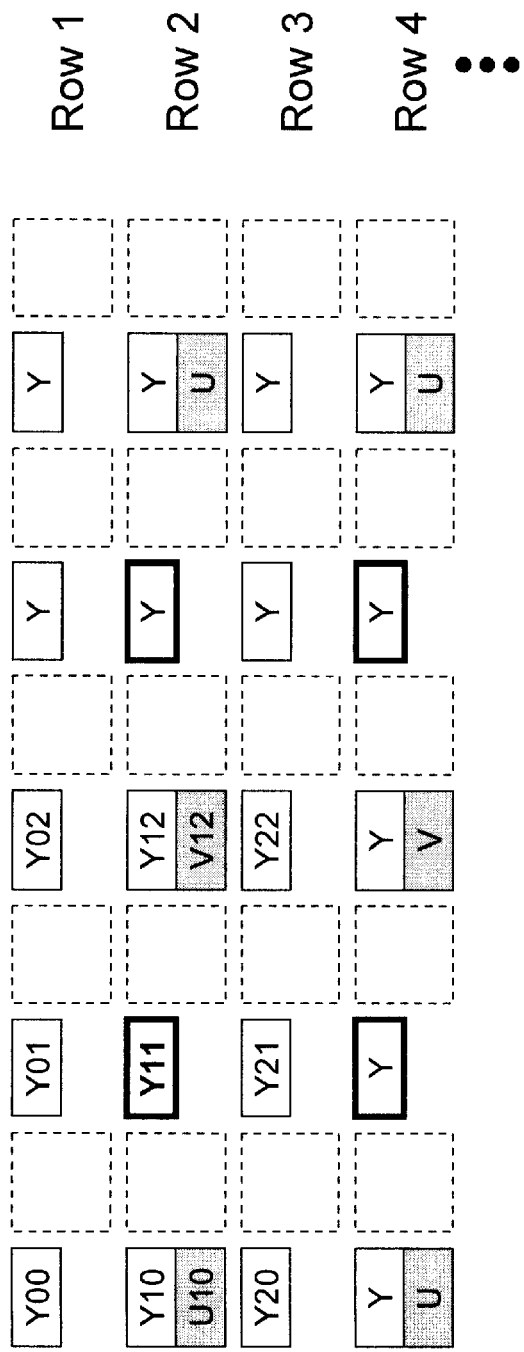

With continued reference to FIG. 8, as noted above, the present inventions also relate to circuitry and techniques for reading down-sampled and/or compressed video data from memory and thereafter, up-sampling or de-compressing such down-sampled and/or compressed video data to, for example, facilitate further processing the video data and, for example, to output and/or display the further processed video data. In this regard, where 2-4 interpolator circuitry 50 reads data from buffer memory 42 and such data is representative of FIG. 11B, 2-4 interpolator circuitry 50 may generate data which is representative of the luminance vales of every other line. In this regard, 2-4 interpolator circuitry 50 may employ a directional interpolation. For example, to generate a luminance component for Y11 (see FIG. 12A), 2-4 interpolator circuitry 50 may implement the following method/techniques:

hdiff=abs(Y00−Y01)+abs(Y01−Y02)

vdiff=abs(Y00−Y10)+abs(Y02−Y12)

if (vdiff<hdiff−32), Y11=Y01, or alternatively the average of (Y01, Y21)

else if (hdiff<vdiff−32), Y11 equals the average of (Y10, Y12)

else Y11 equals the average of (Y01, Y10, Y12) or alternatively (Y01, Y10, Y12, Y21)

The 2-4 interpolation circuitry 50 applies this aspect of the de-compression or up-sampling process/technique to the entire data field.

Notably, the exemplary method/technique discussed immediately above, including the threshold values (for example, "32"), is an exemplary implementation. The interpolation circuitry 50 may implement other methods/techniques including different threshold values. Such threshold values may be programmable or fixed and may be selected or determined using a various considerations such as signal integrity. Moreover, these methods/techniques and/or operations may be implemented in hardware and/or a suitably programmed processor or processor-type device.

With reference to FIG. 12B, 2-4 interpolator circuitry may generate the luminance components in every other pixel in every line via the following method/technique:

Y00a=average of (Y00, Y01)
Y01a=average of (Y01, Y02)

Again, 2-4 interpolation circuitry 50 applies this aspect of the de-compression or up-sampling process/technique to the entire data field or pixels of the frame.

With reference to FIG. 12C, 2-4 interpolator circuitry 50 may generate the chrominance components of certain pixels by interpolating horizontally (from a pixel perspective) via the following method/technique:

U11=¾*U10+¼*U14
U12=½*U10+½*U14
U13=¼*U10+¾*U14
V12a=⅞*V12+⅛*V16
V13a=⅝*V12+⅜*V16
V14a=⅜*V12+⅝*V16
V15a=⅛*V12+⅞*V16

The 2-4 interpolator circuitry 50 may generate the remaining chrominance components of certain pixels by interpolating vertically (from a pixel perspective) via the following method/technique:

U=average of (Uabove, Ubelow)
V=average of (Vabove, Vbelow)

Figures 12C, 12D:
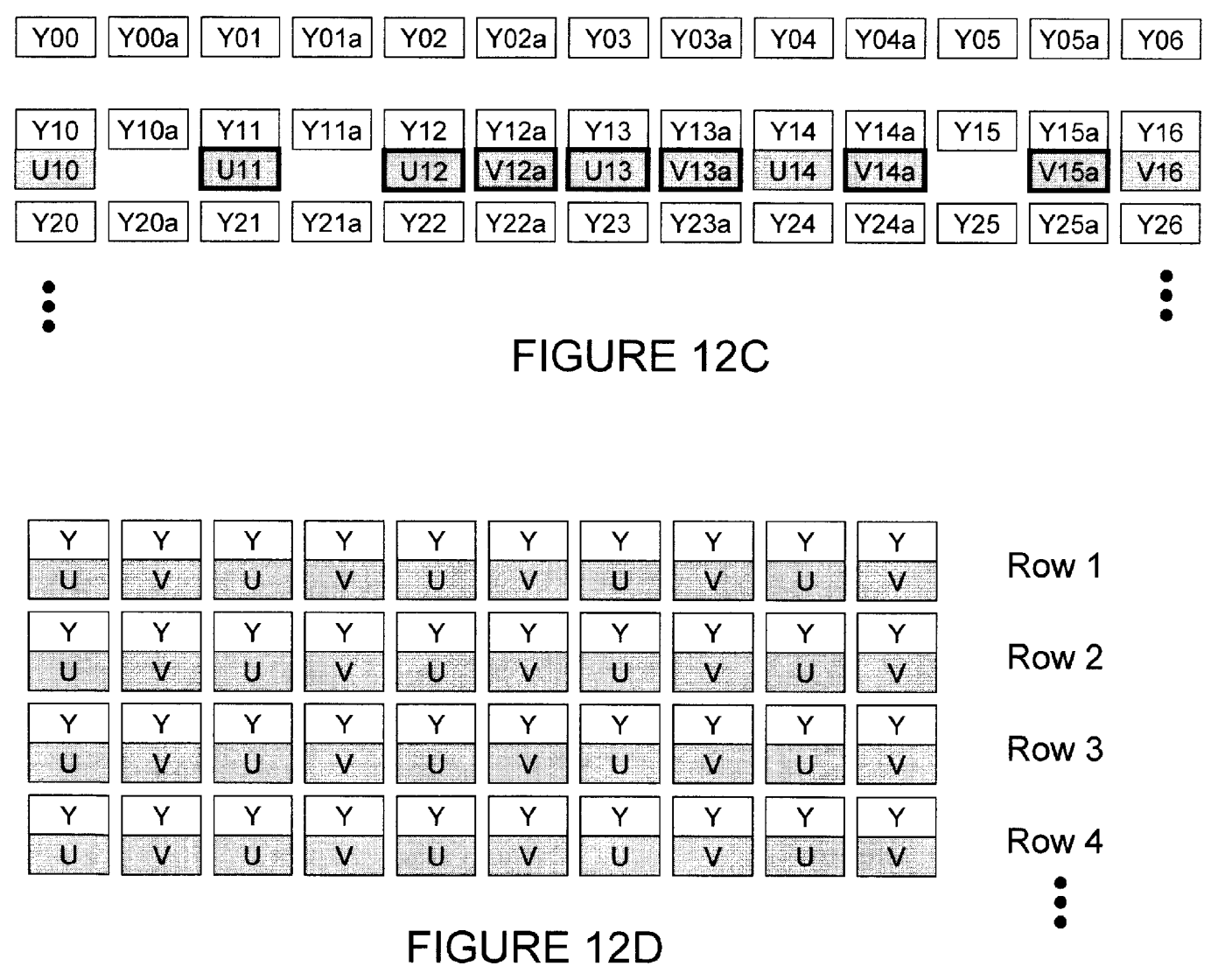

After generation of the remaining chrominance components, 2-4 interpolator circuitry 50 may output the 4:2:2 video standard data format as illustrated in FIG. 12D.

It should be noted that modifications of the de-compression or up-sampling process/technique may be implemented. For example, interpolating horizontally to generate certain chrominance components may employ different multipliers. In addition, 2-4 interpolator circuitry 50 may generate the chrominance components before or after generation of the luminance components. All such modifications are intended to fall within the scope of the present inventions.

With reference to FIGS. 4A-4C, video processing circuitry 26 further includes video manipulation circuitry 36, which generates video output data using the video input data (or a representation of such video input data, for example, a scaled version thereof) and the data output from spatial adaptation circuitry 32 and temporal adaptation circuitry 34 (or a representations of such output data, for example, a scaled versions thereof). In one embodiment, video manipulation circuitry 36 combines (for example, sums) the video input data with (i) the spatially adapted video data and (ii) the temporally adapted video data. The video manipulation circuitry 36 may include summer circuitry to "sum" or "add", on a pixel by pixel basis, the video input data, the spatially adapted video data, and the temporally adapted video data.

Notably, similar to spatial adaptation circuitry 32 and temporal adaptation circuitry 34, video manipulation circuitry 36 may generate video output data using (i) luminance data associated with each pixel, (ii) chrominance data associated with each pixel, or (iii) luminance and chrominance data associated with each pixel. All permutations and combinations thereof are intended to fall within the scope of the present inventions. As noted above, in the context of black and white video, only luminance data associated with each pixel is available for processing by video manipulation circuitry 36.

Figure 13A:
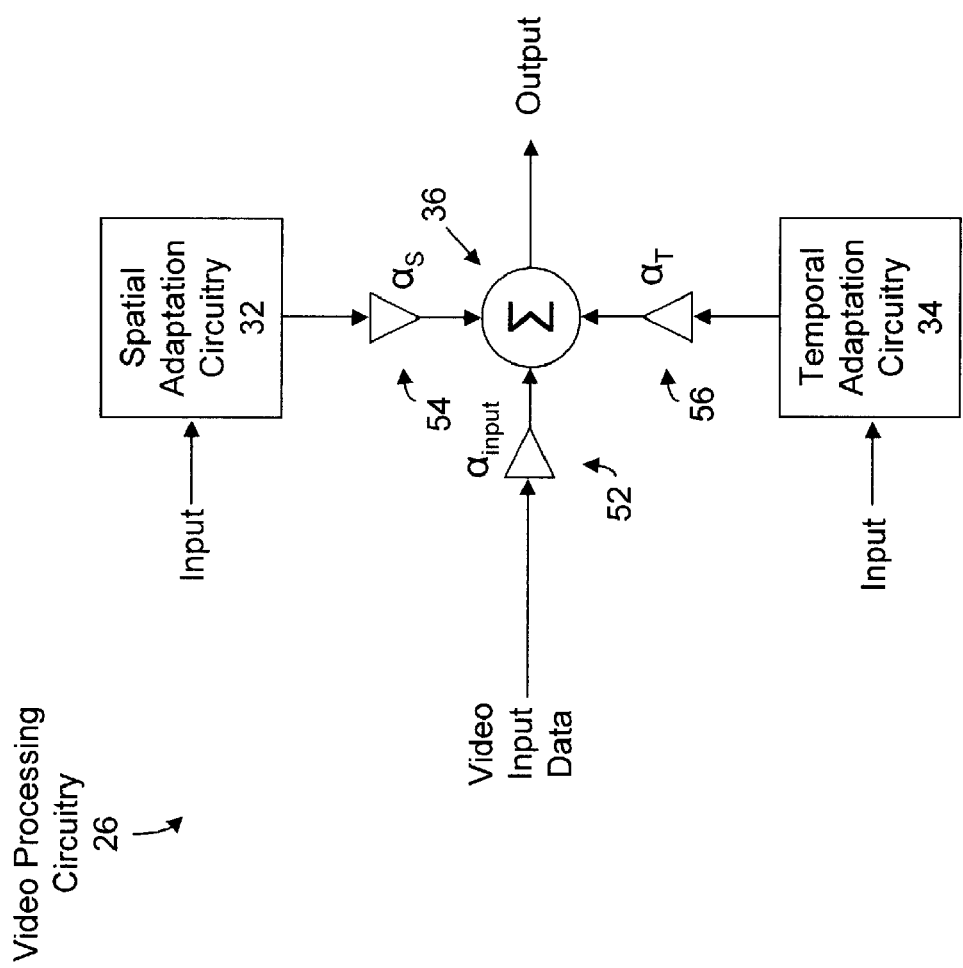
FIG. 13A is a schematic block diagram representation of exemplary video processing circuitry, according to at least certain aspects of the present inventions, wherein the video manipulation circuitry of this exemplary embodiment includes summation circuitry to sum the video input data, and the outputs of spatial adaptation circuitry and temporal adaptation circuitry wherein the outputs may be scaled, amplified, weighted, modified and/or adjusted ($\alpha_S$ and $\alpha_T$) to thereby control the impact of such adaptation circuitry on the video input data; notably, this exemplary embodiment of the video processing circuitry may be implemented in any of the embodiments of the video receiving circuitry and/or video receiver device described and/or illustrated herein (see, for example, FIGS. 1A-3D)
Figure 13B:
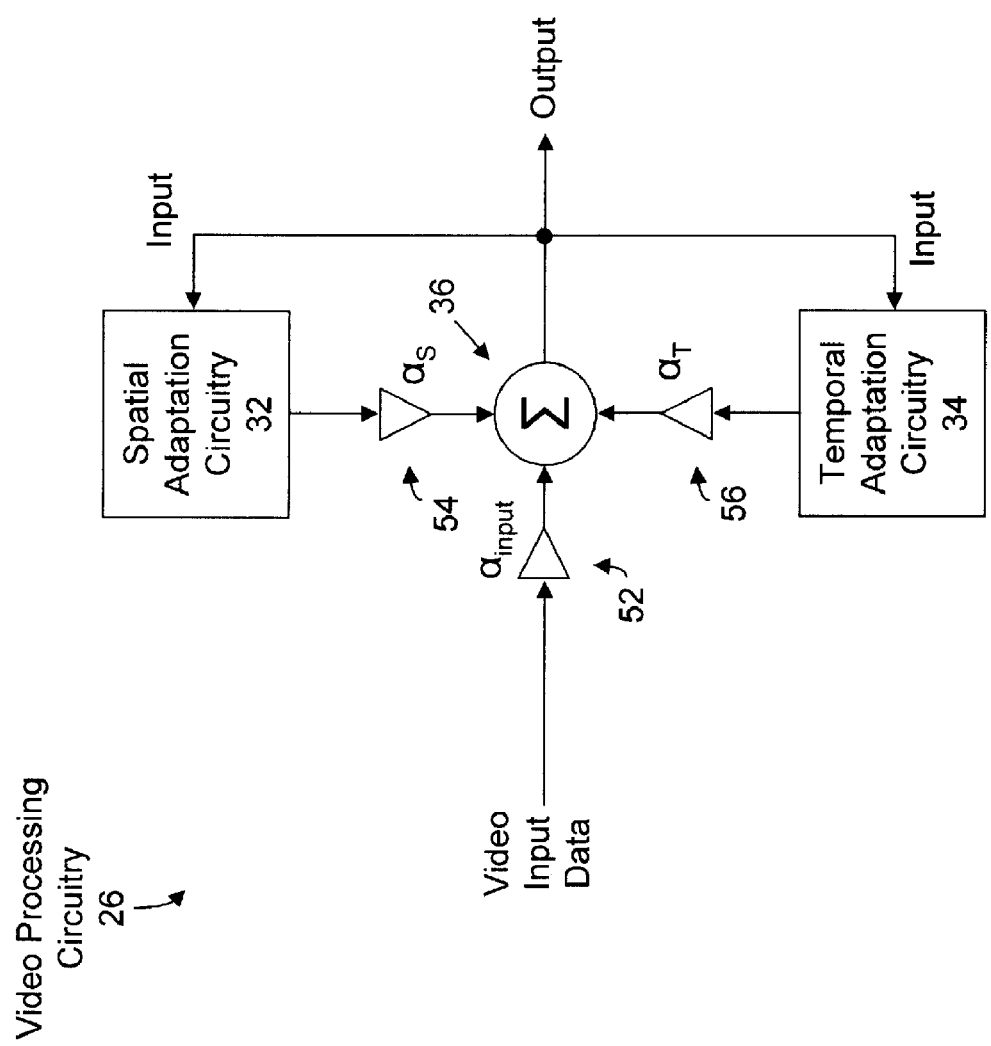
FIGS. 13B and 13C are schematic block diagram representations of exemplary video processing circuitry, according to at least certain aspects of the present inventions, wherein, in one exemplary embodiment, the inputs of spatial adaptation circuitry and temporal adaptation circuitry are in a feedback configuration (for example, acquired from the output of the video manipulation circuitry (FIG. 13B) and, in another exemplary embodiment, the input of the spatial adaptation circuitry is in a feed-forward configuration (for example, the video input data before processing via the video processing circuitry) and the temporal adaptation circuitry is in a feedback configuration (for example, acquired from the output of the video manipulation circuitry FIG. 13C)); notably, these exemplary embodiments of the video processing circuitry may be implemented in any of the embodiments of the video receiving circuitry and/or video receiver device described and/or illustrated herein (see, for example, FIGS. 1A-3D)
Figure 13C:
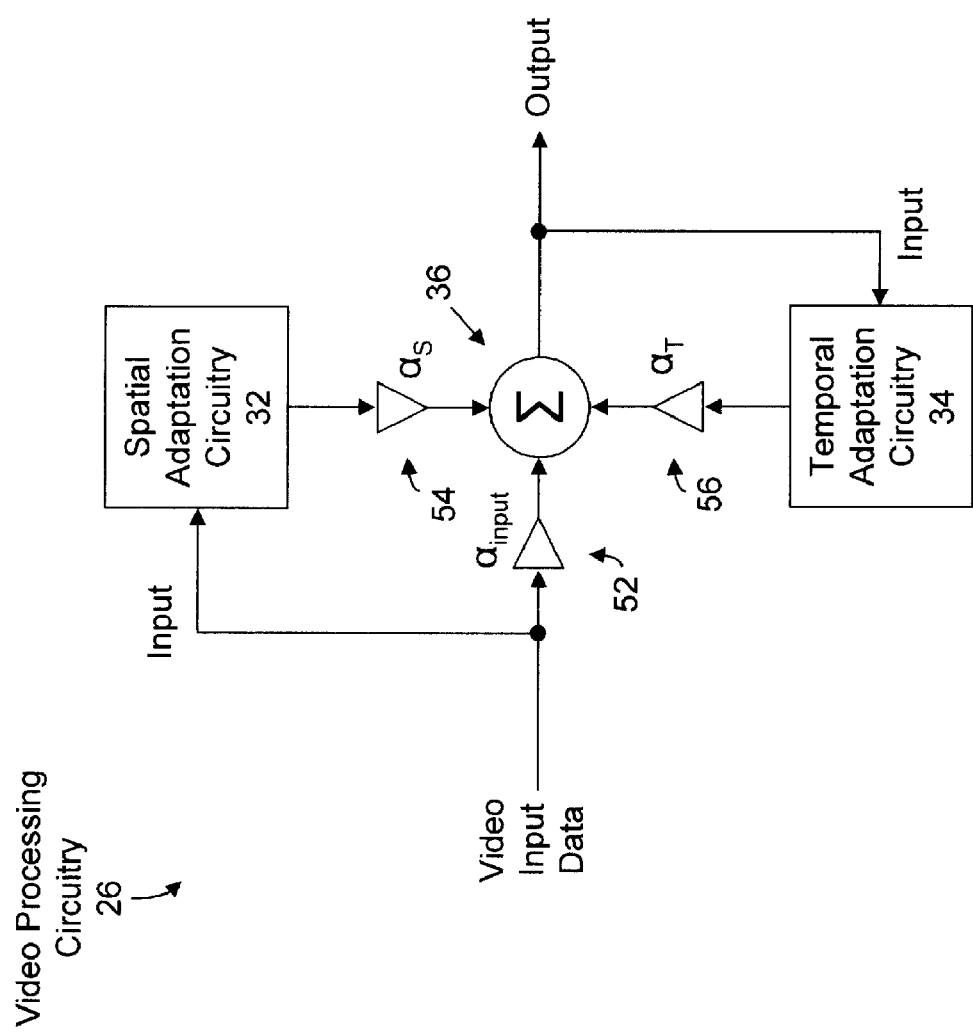

The video manipulation circuitry 36 may generate video output data using a representation of the video input data, and representations of the data outputs from the spatial adaptation circuitry and/or temporal adaptation circuitry. In one exemplary embodiment, video processing circuitry 26 includes one or more scaling circuits 52-56 to scale, amplify, weight, modify, increase or decrease, and/or adjust (collectively herein "scale" or the like, for example, "scaling" or "scaled") the video input data, the spatially adapted video data, and/or the temporally adapted video data (respectively) prior to applying such data to video manipulation circuitry 36. (See, for example, FIGS. 13A-13C). In this embodiment, the amount of scaling of the video input data ($\alpha_{input}$), the amount of scaling of the spatially adapted video data ($\alpha_S$), and/or the amount of scaling of the temporally adapted video data ($\alpha_T$) may be fixed or programmable.

Figure 14D:
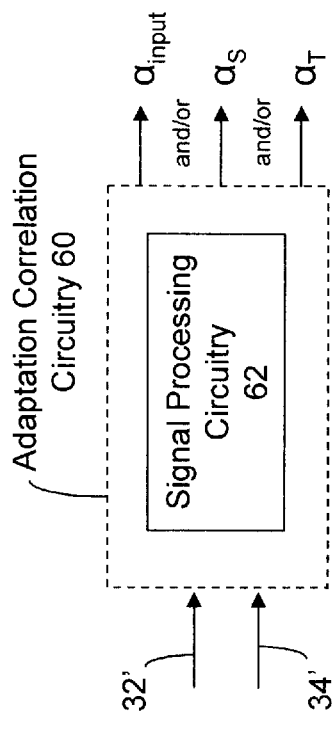
FIG. 14D is a schematic block diagram representation of exemplary adaptation correlation circuitry, according to at least certain aspects of the present inventions, wherein the adaptation correlation circuitry includes signal processing circuitry to determine or calculate an amount of scaling of the (i) video input data, (ii) spatially adapted video data (from spatial adaptation circuitry) and/or (iii) temporally adapted video data (from temporal adaptation circuitry); notably, this exemplary embodiment of the adaptation correlation circuitry may be implemented in any of the embodiments described and/or illustrated herein (for example, FIGS. 1A-3D and 15A-15C)
Figure 14E:
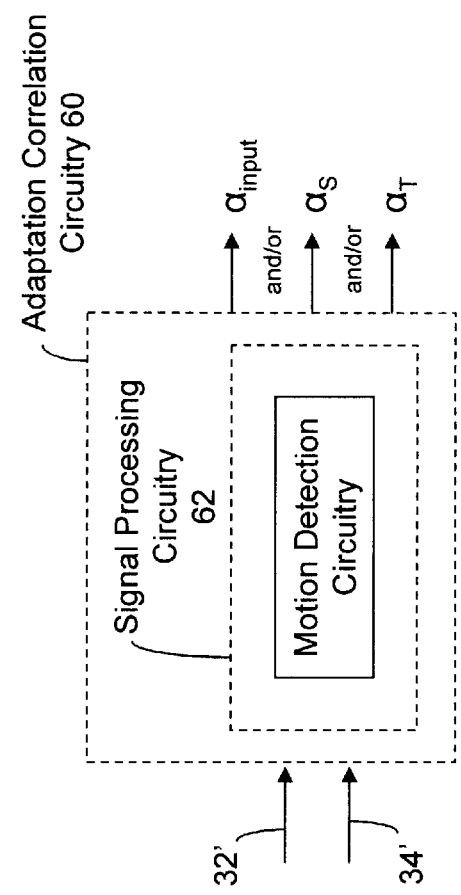
FIG. 14E is a schematic block diagram representation of exemplary adaptation correlation circuitry, according to at least certain aspects of the present inventions, wherein the signal processing circuitry of the adaptation correlation circuitry includes motion detection circuitry to determine or calculate, based on an amount of motion of the video in the video input data, an amount of scaling of the (i) video input data, (ii) spatially adapted video data (from spatial adaptation circuitry) and/or (iii) temporally adapted video data (from temporal adaptation circuitry); notably, this exemplary embodiment of the adaptation correlation circuitry may be implemented in any of the embodiments described and/or illustrated herein (for example, FIGS. 1A-3D and 15A-15C)

In one embodiment, the amount of scaling of the video input data ($\alpha_{input}$), the amount of scaling of the spatially adapted video data ($\alpha_S$), and/or the amount of scaling of the temporally adapted video data ($\alpha_T$) is non-programmable by designing a fixed scaling factor or value into scaling circuits 52-56 (for example, fixed gain for an amplifier). In another embodiment, the amount of scaling is one time programmable (for example, programmed during test or at manufacture) or more than one time programmable (for example, during test, start-up/power-up, during an initialization sequence and/or during operation of the video processing circuitry (for example, in situ)). In this regard, with reference to FIG. 14A, in one embodiment, video processing circuitry 26 may include memory 58 to store the scaling information for scaling circuits 52, 54 and/or 56. For example, the video processing circuitry may include fuses or anti-fuses, or DRAM, SRAM, ROM, PROM, EPROM, EEPROM and/or Flash memory cells, to store data which is representative of the amount of scaling for use by the scaling circuits 52, 54 and 56.

The amount of scaling incorporated or introduced by circuits 52, 54 and/or 56 associated with each of the video input data, the spatially adapted video data, and/or the temporally adapted video data, respectively, may be stored in one or more registers of memory 58. In this embodiment, the amount of scaling may be provided to one or more scaling circuits 52, 54 and/or 56 at, for example, start-up/power-up, during an initialization sequence, by external broadcast circuitry and/or in response to one or more user or operator instructions or inputs. Indeed, in one embodiment, the amount of scaling is determined at start-up/power-up, during an initialization sequence, by external broadcast circuitry and/or in response to user or operator instructions based on information which is representative of the geographic region and/or the video standard (for example, NTSC, PAL, SECAM or DVB-T) in which the device is operated) and thereafter such scaling information is provided to scaling circuits 52, 54 and 56 associated with video input data, and/or data outputs from spatial adaptation circuitry 32 and/or temporal adaptation circuitry 34.

Notably, memory 58 (for example, a register) may be a permanent, semi-permanent or temporary (i.e., until re-programmed) storage; for example, a DRAM, SRAM, ROM, PROM, EPROM, EEPROM and/or Flash memory cells that are resident on (i.e., integrated in) the interface circuitry, device or system, or external thereto (i.e., not integrated in). Indeed, the scaling information for the video input data, the spatial adapted data and/or temporal adapted data (whether in a relative or absolute manner) may be defined via a particular fixed configuration of the state of switch(es) or certain pin(s) on the package of the device (which may be, for example, defined or established during manufacturing). All circuitry and techniques of (i) storing scaling information and/or (ii)

programming the scaling circuits during before or during operation are intended to fall within the scope of the present invention.

In another embodiment, with reference to FIG. 14B or 14C, adaptation correlation circuitry 60 determines or calculates one, some or all of the amount of scaling for the (i) video input data, (ii) spatially adapted video data, and (iii) temporally adapted video data. In one embodiment, adaptation correlation circuitry 60 may determine or calculate the amount of scaling using and/or based on the signal integrity of the input video signal (for example, the signal to noise ratio, signal strength and/or signal interference). For example, signal integrity detection circuitry may measure the signal-to-noise ratio (SNR), signal strength and/or signal interference of, for example, the demodulated video signal and, in relation to one or more threshold values, signal processing circuitry 62 may determine or calculate an amount of scaling for the video input data (in a relative manner (for example, an amount of scaling relative to the amount of scaling of the spatially adapted video data and the temporally adapted video data) or a absolute manner). For example, where the SNR falls below a first threshold, adaptation correlation circuitry 60 may provide a first predetermined amount of scaling of the video input data relative to the amount of scaling of the spatially adapted video data and the temporally adapted video data. In the event that the SNR falls below a second threshold, adaptation correlation circuitry 60 may provide a second predetermined amount of scaling of the video input data relative to the amount of scaling of the spatially adapted video data and the temporally adapted video data. In this embodiment, the signal integrity of the input video signal is used by the signal processing circuitry 62 to determine or calculate the amount of scaling of the video input data ($\alpha_{input}$), and (i) the amount of scaling of the spatially adapted video data ($\alpha_S$) and/or (ii) the amount of scaling of the temporally adapted video data ($\alpha_T$).

In another embodiment, the signal integrity detection circuitry may measure the SNR, signal strength and/or signal interference of, for example, the demodulated video signal and, in relation to one or more threshold values, signal processing circuitry 62 may determine or calculate the amount of scaling for the video input data in an absolute manner. For example where the SNR is less than a first threshold, adaptation correlation circuitry 60 may provide a first predetermined amount of scaling of the video input data (for example, 50%—wherein $\alpha_{input}$=0.5). In the event that the SNR falls below a second threshold, adaptation correlation circuitry 60 may provide a second predetermined amount of scaling of the video input data (for example, 30%—wherein $\alpha_{input}$=0.3). Thus, in this embodiment, the signal integrity of, for example, the demodulated video signal, may determine the amount of scaling of the video input data ($\alpha_{input}$) without regard of (i) the amount of scaling of the spatially adapted video data ($\alpha_S$) and/or (ii) the amount of scaling of the temporally adapted video data ($\alpha_T$). Indeed, in this embodiment, the amount of scaling for the video input data may be determined based on one or more factors (for example, signal integrity) and the impact of the spatially adapted video data relative to the impact of the temporally adapted video data may be determined based on one or more other factors (for example, the amount of "motion" in the video).

Notably, the signal integrity detection circuitry may be implemented using a plurality of discrete logic, passive elements and/or active elements, sensors, a state machine, a special or general purpose processor (suitably programmed) and/or a field programmable gate array (or combinations thereof). Indeed, all permutations and/or combinations of sensors and/or integrated, discrete, hardwired and programmable circuitry (which is programmed, for example, via software) for implementing signal integrity detection circuitry (or portions thereof) are intended to fall within the scope of the present inventions.

With reference to FIGS. 14C, 14D and 15A-15C, adaptation correlation circuitry 60 may include signal processing circuitry 62 to determine or calculate the amount of scaling for the video input data, the spatially adapted video data and/or the temporally adapted video data. In one embodiment, signal processing circuitry 62 may determine or calculate such scaling using (i) spatially adapted video data (from spatial adaptation circuitry 32) and/or (ii) temporally adapted video data (from temporal adaptation circuitry 34). The signal processing circuitry 62 may employ any of the techniques described herein. Indeed, there many techniques for determining or calculating the scaling for the video input data, the spatially adapted video data and/or the temporally adapted video data ($\alpha_{input}$ and/or $\alpha_S$ and/or $\alpha_T$); all such techniques are intended to fall within the scope of the present inventions.

Notably, signal processing circuitry 62 may be implemented using a plurality of discrete logic, passive elements and/or active elements, and/or a state machine, a special or general purpose processor (suitably programmed) and/or a field programmable gate array (or combinations thereof). Indeed, all permutations and/or combinations of integrated, discrete, hardwired and programmable circuitry (which is programmed, for example, via software) for implementing signal processing circuitry 62 (or portions thereof) are intended to fall within the scope of the present inventions.

As noted above, the amount of scaling introduced or applied by scaling circuit 52 of the video input data may be fixed or predetermined, for example, at start-up/power-up, during an initialization sequence, by external broadcast circuitry and/or in response to one or more user or operator instructions or inputs. In certain embodiments, the amount of scaling introduced or applied by scaling circuit 52 is based on or relative to the amount of scaling of the spatially adapted video data and/or the temporally adapted video data (for example, $\alpha_{input}=1-(\alpha_S+\alpha_T)$). Notably, in certain other embodiments, the amount of scaling introduced or applied by scaling circuit 52 may be programmable based on the operation of the video receiving circuitry and/or video receiver device (i.e., in situ determination).

Figure 15A:
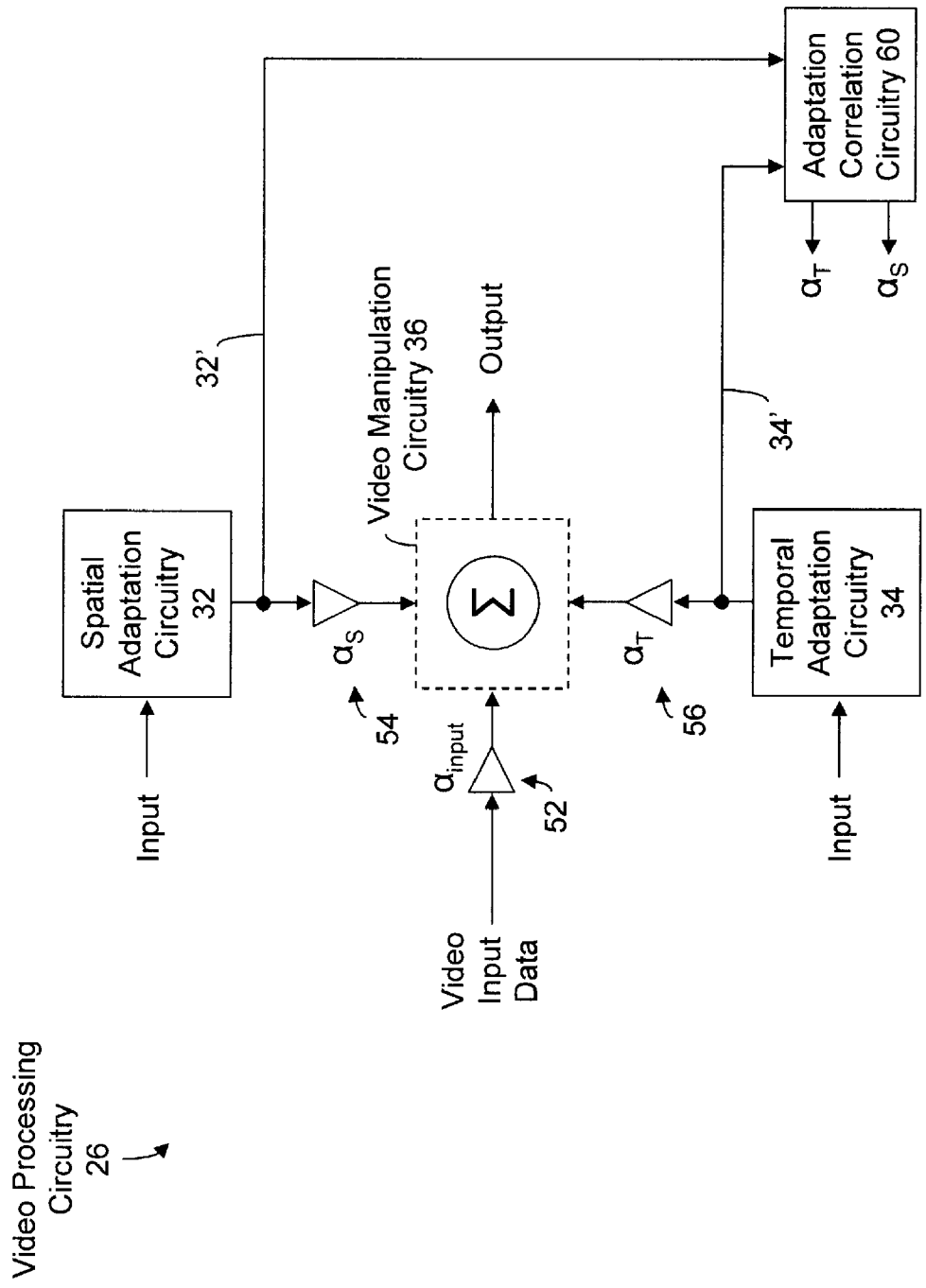
FIGS. 15A-15C are schematic block diagram representations of exemplary video processing circuitry, according to at least certain aspects of the present inventions, wherein, in these embodiments, the video processing circuitry includes adaptation correlation circuitry to calculate, generate and/or determine the scaling, amplifying, weighting, modifying and/or adjusting the impact of the outputs of the spatial adaptation circuitry and spatial adaptation circuitry on the video input data; notably, these exemplary embodiments of the video processing circuitry may be implemented in any of the embodiments of the video receiving circuitry and/or video receiver device described and/or illustrated herein (see, for example, FIGS. 1A-3D)
Figure 15B:
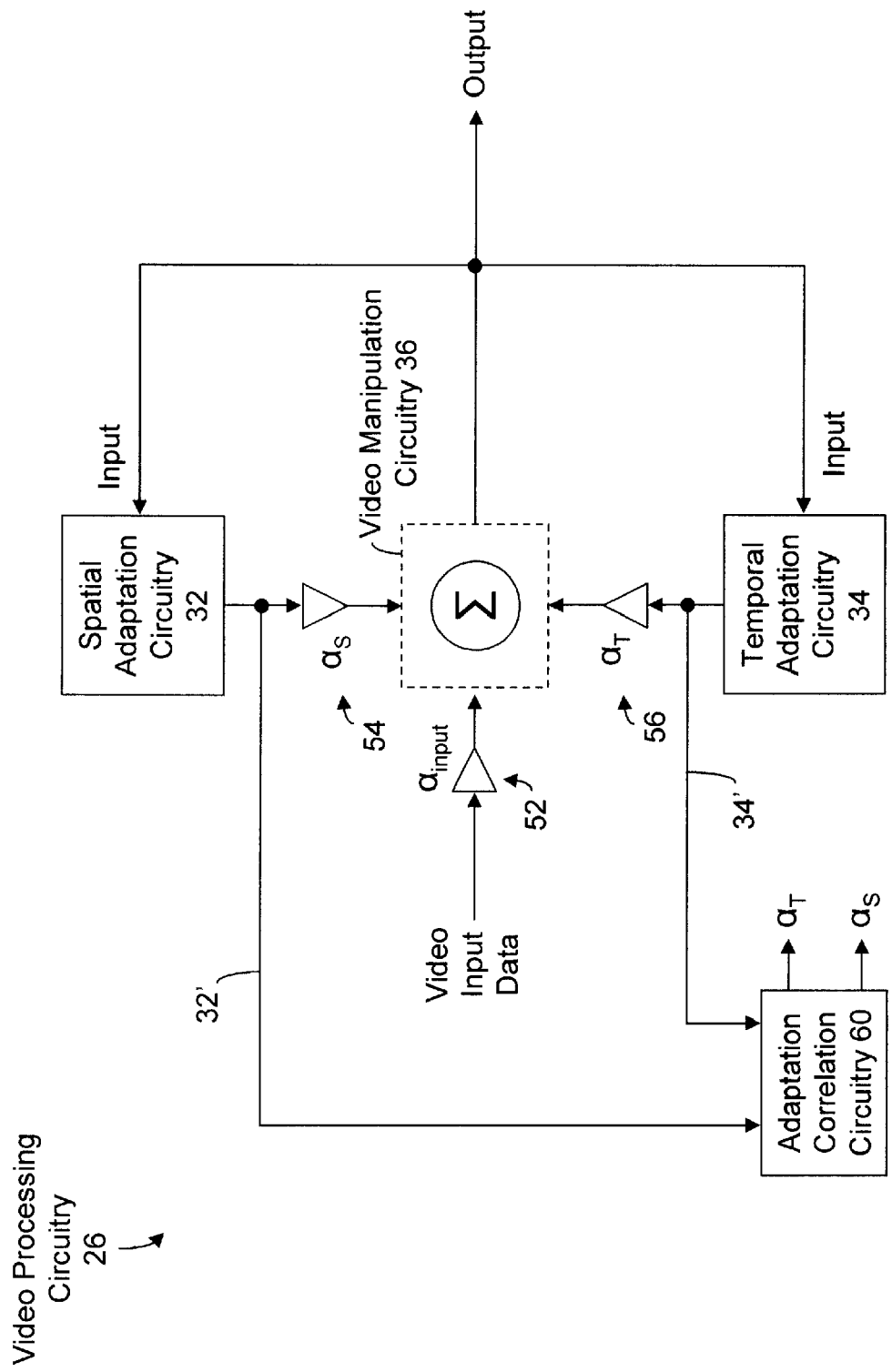
Figure 15C:
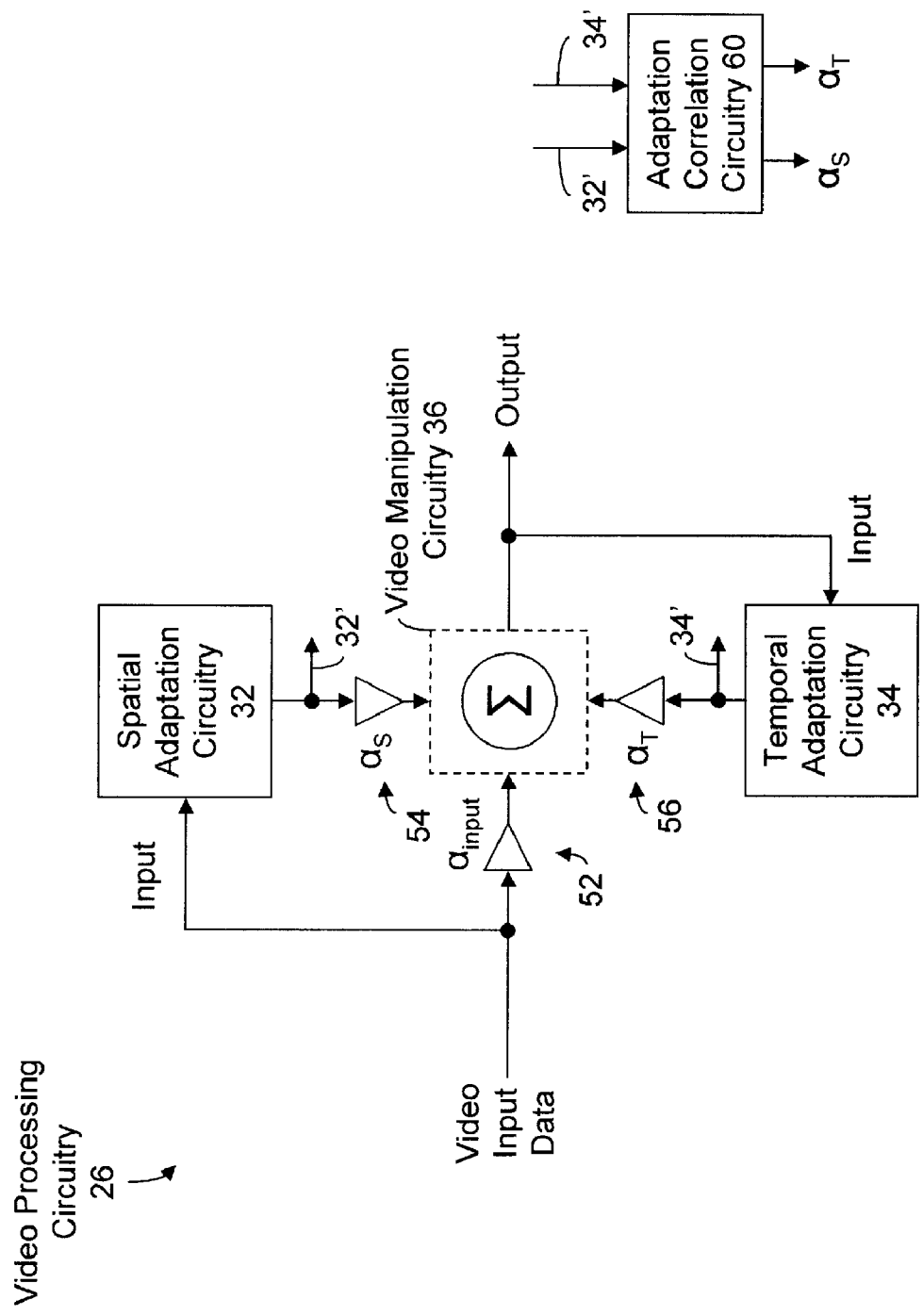

With reference to FIGS. 15A-15C, adaptation correlation circuitry 60, in one embodiment, determines or calculates the amount of scaling of the spatially adapted video data (from spatial adaptation circuitry 32) and/or temporally adapted video data (from temporal adaptation circuitry 34) using the spatially adapted video data and/or the temporally adapted video data. The adaptation correlation circuitry 60, in this embodiment, determines the amount of scaling introduced or applied by spatial scaling circuit 54 and temporal scaling circuit 56 during operation of the video receiving circuitry and/or video receiver device.

For example, with reference to FIGS. 14C-14E and FIGS. 15A-15C, adaptation correlation circuitry 60, in one embodiment, may determine or calculate the amount of scaling based on and/or in relation or response to an amount of "motion" in the video of the video input data. As such, in this embodiment, signal processing circuitry 62 includes motion detection circuitry to, in one embodiment, assess or determine whether there is "motion" in the video and, in certain embodiments, the amount of motion. The motion detection circuitry may determine such motion (and, in certain embodiments, the amount of motion) based on "differences" between corresponding pixel values of the spatially adapted video data and the temporally adapted video data. For example, signal processing circuitry 62 may determine motion in the video based on the changes in luminance between the luminance components of corresponding pixels in one or more different frames. In another embodiment, signal processing circuitry 62, based on the assessment or determination of motion and the amount or extent of such motion, calculates or determines the amount of scaling for the spatially adapted video data and the temporally adapted video data ($\alpha_S$ and $\alpha_T$). In response, adaptation correlation circuitry 60 generates control or data signals which are representative of the amount of scaling and provides or applies such signals to scaling circuits 54 and 56.

In one embodiment, signal processing circuitry 62 may adjust the amount of scaling of the spatially adapted video data relative to the amount of scaling of the temporally adapted video data based on an amount of motion detected in the video of, for example, the video input data. For example, where there is relatively significant motion, signal processing circuitry 62 increases the impact of the spatially adapted video data relative to the temporally adapted video data by applying an increased amount of scaling to scaling circuit 54 ($\alpha_S$), relative to the amount of scaling to scaling circuit 56 ($\alpha_T$), which causes an increase in the spatially adapted video data relative to the temporally adapted video data. In contrast, where the amount of motion is determined to less significant, signal processing circuitry 62 increases the impact of the temporally adapted video data relative to the spatially adapted video data by applying an increased amount of scaling to scaling circuit 56 ($\alpha_T$), relative to the amount of scaling to scaling circuit 54 ($\alpha_S$), which causes an increase in the temporally adapted video data relative to the spatially adapted video data. Notably, the amount of scaling introduced or applied to the video input data by scaling circuit 52 may be determined using any of the techniques described herein, for example, such scaling ($\alpha_{input}$) may be based on or relative to the amount of scaling of the spatially adapted video data and the temporally adapted video data (for example, $\alpha_{input}=1-(\alpha_S+\alpha_T)$).

In one embodiment, the motion detection circuitry of signal processing circuitry 62 may compare the pixel values (for example, the luminance components of the pixels) of the video input data (the "current" pixel values) to values (for example, the luminance components) of corresponding pixels of the temporally adapted video data to determine "differences" there between. Based on that comparison, the motion detection circuitry of signal processing circuitry 62 may assess or determine whether there is "motion" in the video and correspondingly change the amount of scaling of the spatially adapted video data relative to the amount of scaling of the temporally adapted video data. In another embodiment, the motion detection circuitry of signal processing circuitry 62 may determine, assess or calculate the amount or extent of motion in the video. Where there is relatively significant motion in the video, signal processing circuitry 62 increases the amount of scaling of the spatially adapted video data relative to the amount of scaling of the temporally adapted video data by suitably controlling the scaling circuit 54 ($\alpha_S$) and scaling circuit 56 ($\alpha_T$).

Thus, adaptation correlation circuitry 60, based on the assessment of motion (and, in certain embodiments, the amount or extent of such motion), determines or calculates the amount of scaling for the spatially adapted video data and the temporally adapted video data ($\alpha_S$ and $\alpha_T$). In response, adaptation correlation circuitry 60 generates signals which are representative of the amount of scaling and provides or applies such signals to scaling circuits 54 and 56. In this way, the impact of the outputs of such adaptation circuitry 32 and 34 on the video input data may be controlled, adjusted, adapted and/or modified (in situ) according to the images in the video.

Notably, all techniques and circuitry to determine motion in video are intended to fall within the scope of the present invention. In one exemplary embodiment, signal processing circuitry 62 may determine "motion" in the video, and, in turn, determine or calculate the amount of scaling for the spatially adapted video data and the temporally adapted video data ($\alpha_S$ and $\alpha_T$) using a comparison of the luminance component of the pixel value of certain neighboring pixels (in this exemplary embodiment, a 3×3 matrix of neighboring pixels are compared, see x=[−1,0,1],y=[−1,0,1] below). The motion detection techniques may be expressed as follows:

est_s=current Y (spatial adaptation circuitry)
    est_t=field buffer Y (temporal adaptation circuitry)
    max_diff (output of motion detector)= $\max_{x=[-1,0,1],y=[-1,0,1]}(\text{est\_s}[i,j]-\text{est\_t}[i+y, x+j])$
    thresh/=8
    thresh2=64
    if (max_diff<thresh1) rho_s=0
    else if (max_diff<thresh1+thresh2) rho_s=(max_diff−thresh1)/thresh2
    else rho_s=1
    rho_t=1−rho_s
    alpha_s=rho_s*alpha
    alpha_t=rho_t*alpha
    data=(1−alpha)*data+alpha_s*spatial_filtered+alpha_t*field_buffer Notably, "rho_t" and "rho_s" are proportional to $\alpha_T$ and $\alpha_S$, respectively. Moreover, in this exemplary embodiment, signal processing circuitry 62 employs the luminance data associated with each pixel of a frame (whether interlaced or non-interlaced) output from spatial adaptation circuitry 32 and temporal adaptation circuitry 34. Thus, in this exemplary embodiment, signal processing circuitry 62 does not use chrominance data associated with each pixel to calculate or generate $\alpha_T$ and $\alpha_S$. This notwithstanding, all permutations and combinations of luminance and chrominance data are intended to fall within the scope of the present inventions. As noted above, in the context of black and white video, only luminance data associated with each pixel is available for processing by signal processing circuitry 62.

Further, in this exemplary embodiment, the amount of scaling introduced or applied to the video input data by scaling circuit 52 may be determined using any of the techniques described herein, for example, such scaling ($\alpha_{input}$) may be based on or relative to the amount of scaling of the spatially adapted video data and the temporally adapted video data (for example, $\alpha_{input}=1-(\alpha_S+\alpha_T)$).

Notably, the exemplary method/technique discussed immediately above, including the threshold values (for example, "8" and "64"), are merely exemplary implementations. The signal processing circuitry 62 may implement other methods/techniques as well as different threshold values. Indeed, such threshold values may be programmable or fixed and may be selected or determined using a various considerations such as signal integrity. Moreover, these methods/techniques and/or operations may be implemented in hardware and/or a suitably programmed processor or processor-type device.

Figure 16:
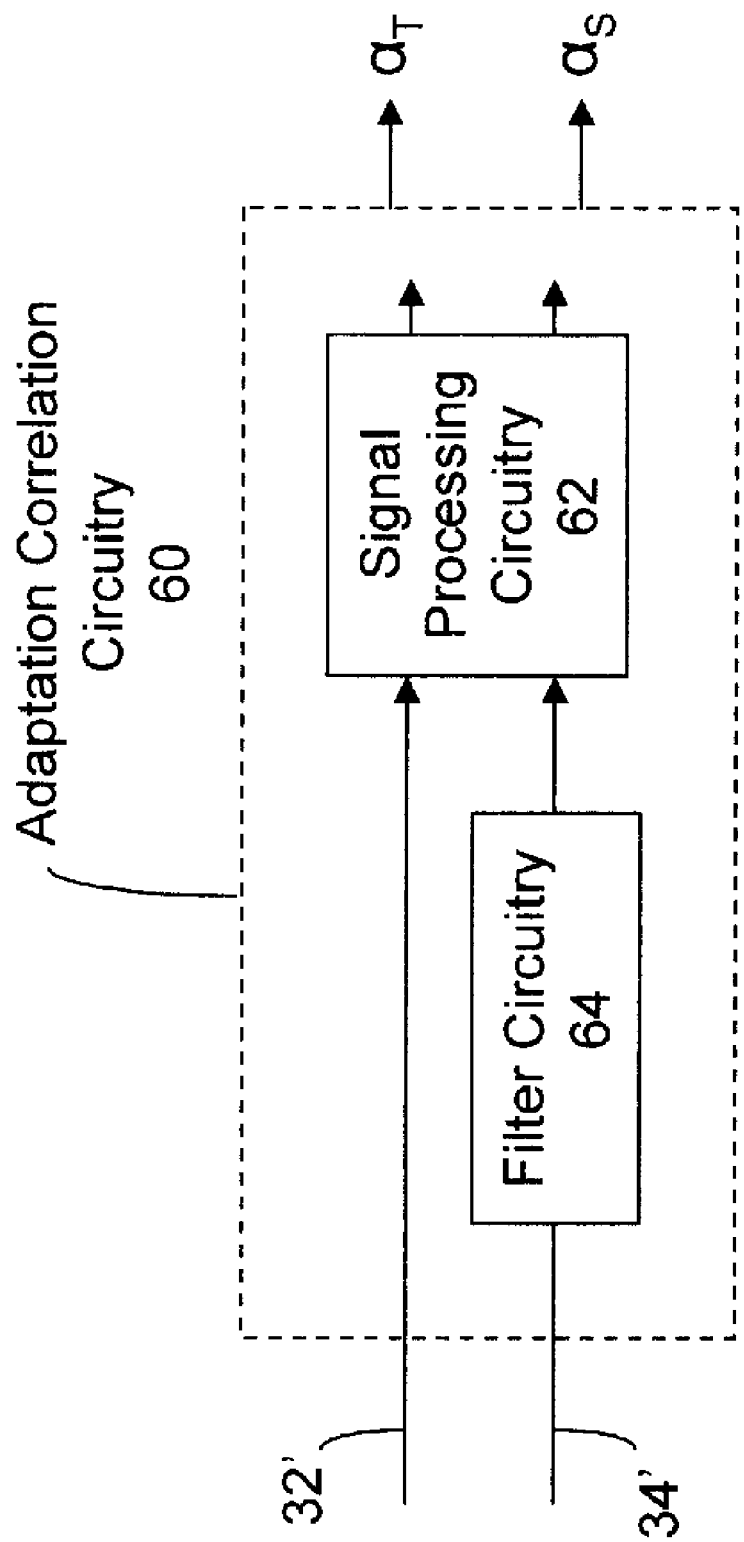
FIGS. 16 and 18 are schematic block diagram representations of exemplary adaptation correlation circuitry, according to at least certain aspects of the present inventions; notably, these exemplary embodiments of the adaptation correlation circuitry may be implemented in any of the embodiments described and/or illustrated herein (for example, FIGS. 15A-15C)

With reference to FIG. 16, in another embodiment, adaptation correlation circuitry 60 includes, in addition to signal processing circuitry 62 (which may include motion detection circuitry), filter circuitry 64 to receive and filter the temporally adapted video data (output by temporal adaptation circuitry 34). In this embodiment, video data (for example, the luminance components of each pixel value) from temporal adaptation circuitry 34 may be filtered in a manner that is the same as (or substantially the same as) the filtering of video data performed by/in spatial adaptation circuitry 32. In this way, the video data of temporal adaptation circuitry 34 is processed in the same or substantially or effectively the same manner as the video input data (the "current" video data) as the processing of the video input data performed by/in spatial adaptation circuitry 32.

With that in mind, in one embodiment, filter circuitry 64 may include finite impulse response filter circuitry which is the same as (or substantially or effectively the same as) to finite impulse response filter circuitry 38. (See, FIG. 6A). In another embodiment, filter circuitry 64 may include spatial blurring filter circuitry which is the same as (or substantially the same as) to spatial blurring filter circuitry 40. (See, FIG. 6B). For the sake of brevity, the discussions above with respect to filters 38 and 40 are not repeated here, but are incorporated herein by reference.

Figure 17:
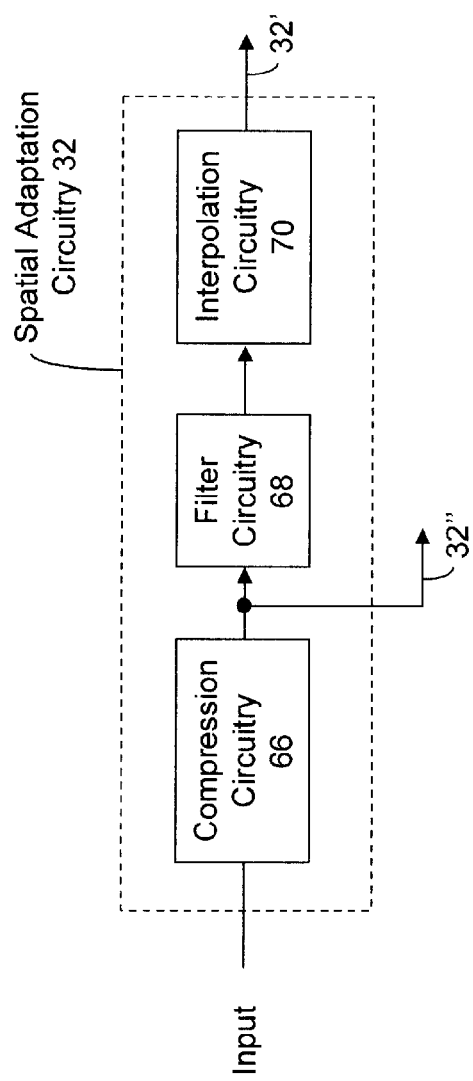
FIG. 17 is a schematic block diagram representation of exemplary spatial adaptation circuitry, according to at least certain aspects of the present inventions; notably, this exemplary embodiment of the spatial adaptation circuitry may be implemented in any of the embodiments described and/or illustrated herein (for example, FIGS. 4A-4D, 13A-13C and 15A-15C)

As noted above, the present inventions are neither limited to any single aspect nor embodiment thereof, nor to any combinations and/or permutations of such aspects and/or embodiments. Each of the aspects of the present inventions, and/or embodiments thereof, may be employed alone or in combination with one or more of the other aspects of the present inventions and/or embodiments thereof. For example, the present inventions may employ the techniques and circuitry that stores a fraction of the data corresponding to a video frame (for example, a ¼) in buffer memory 42 with certain aspects of other inventions hereof (see, for example, FIG. 11A or 11B). For example, with reference to FIGS. 8, 15C, 17 and 18, in one embodiment, spatial adaptation circuitry 32 includes compression circuitry 66, filter circuitry 68 and interpolation circuitry 70 (see FIG. 17), and adaptation correlation circuitry 60 includes interpolation circuitry 72a and 72b, filter circuitry 74a and 74b, and signal processing circuitry 62 (see FIG. 18). In this embodiment, video input data is compressed (for example, sub 2 compression wherein the luminance component of every second pixel is "discarded") in spatial adaptation circuitry 32, the compressed data is then filtered via filter circuitry 68 (for example, filter circuitry having a finite impulse response) and thereafter, the filtered data is expanded, via interpolation circuitry 70 (for example, sub 2 expansion wherein the luminance component of every second pixel is "reconstructed" using any of the techniques described herein, now known or later developed—for example, a horizontal or vertical interpolation technique).

Figure 18:
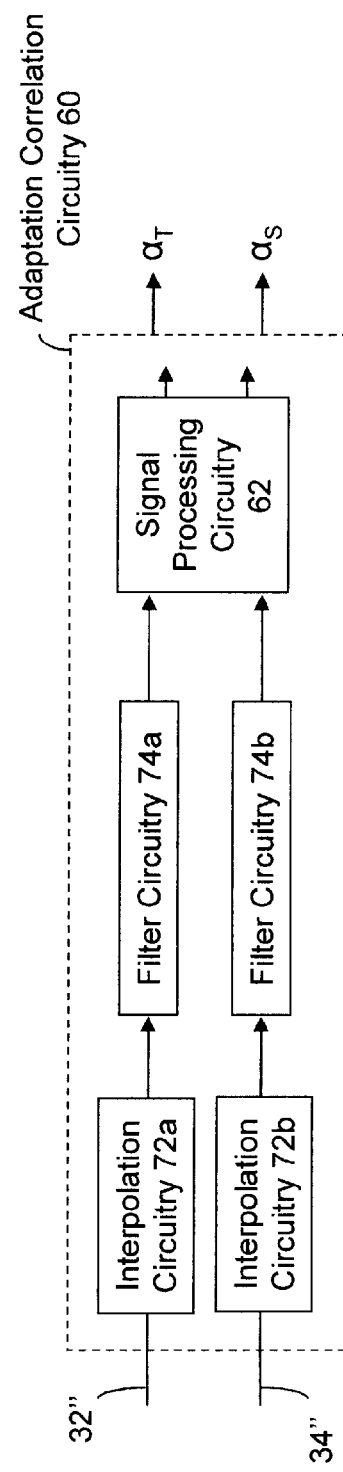

Further in this embodiment, adaptation correlation circuitry 60 generates, determines and/or calculates an amount of scaling of the spatially adapted video data and the temporally adapted video data ($\alpha_S$ and $\alpha_T$) using compressed pixel data (for example, compressed luminance data). With reference to FIG. 18, the adaptation correlation circuitry 60 receives compressed luminance data from compression circuitry 66 (in the spatial adaptation circuitry path—see FIG. 17) and receives compressed luminance data from buffer memory 42 (in the temporal adaptation circuitry path—see FIG. 8). In this regard, adaptation circuitry 60 disregards or "discards" the chrominance components of the pixel data from compression circuitry 66.

The interpolation circuitry 72a and 72b of adaptation correlation circuitry 60 may read data from compression circuitry 66 and buffer memory 42, respectively, and generate data which is representative of the luminance vales of every other line. In one embodiment, interpolation circuitry 72a and 72b may employ a directional interpolation. For example, to generate a luminance component for Y11 (see FIG. 12A), interpolation circuitry 72a and 72b may implement the following method/techniques:

hdiff=abs(Y00−Y01)+abs(Y01−Y02)

vdiff=abs(Y00−Y10)+abs(Y02−Y12)

if (vdiff<hdiff−32), Y11=Y01, or alternatively the average of (Y01, Y21)

else if (hdiff<vdiff−32), Y11 equals the average of (Y10, Y12)

else Y11 equals the average of (Y01, Y10, Y12) or alternatively (Y01, Y10, Y12, Y21)

The interpolation circuitry 72a and 72b applies this aspect of the de-compression or up-sampling process/technique to each respective data field.

As noted previously, the exemplary method/technique discussed immediately above, including the thresholds values (for example, "32"), is an exemplary implementation. The circuitry may implement other methods/techniques including different thresholds values. Indeed, such threshold values may be programmable or fixed and may be selected or determined using a various considerations as discussed above.

Notably, interpolation circuitry 72a may generate luminance components for certain pixel values/data and overwrite or replace corresponding luminance components of the input video data (i.e., original data from the video input data). Such a technique, however, mirrors certain data processing of/in temporal adaptation circuitry 34.

With continued reference to FIG. 18, the data in each respective path (from interpolation circuitry 72a and 72b) are applied to filter circuitry 74a and 74b. In one embodiment, the filter circuitry 74a and 74b are finite impulse response type filters which is the same as (or substantially the same as) to finite impulse response filter circuitry 38. (See, FIG. 6A). In another embodiment, filter circuitry 64 may include spatial blurring filter circuitry which is the same as (or substantially the same as) to spatial blurring filter circuitry 40. (See, FIG. 6B). For the sake of brevity, the discussions above with respect to filters 38 and 40 are not repeated here, but are incorporated herein by reference.

The signal processing circuitry 62 uses the filtered data from circuitry 74a and 74b to determine and/or calculate an amount of scaling of the spatially adapted video data and the temporally adapted video data ($\alpha_S$ and $\alpha_T$). The signal processing circuitry 62 may employ any process and/or technique described and/or illustrated herein. For the sake of brevity, such discussions with respect to signal processing circuitry 62 are not repeated here, but are incorporated herein by reference.

With reference to FIG. 15C, video manipulation circuitry 36, which generates video output data using a scaled version of video input data, a scaled version of the spatially adapted data and a scaled version of the temporally adapted data. The video manipulation circuitry 36 may combine (for example, sum) the video input data with (i) the spatially adapted video data and (ii) the temporally adapted video data. The video manipulation circuitry 36 may include summer circuitry to "sum" or "add", on a pixel by pixel basis, the video input data, and the spatially adapted video data, and the temporally adapted video data.

Notably, in this embodiment, video manipulation circuitry 36 may generate video output data using (i) luminance data associated with each pixel, or (iii) luminance and chrominance data associated with each pixel. As noted above, in the context of black and white video, only luminance data associated with each pixel is available for processing by video manipulation circuitry 36.

The circuitry and/or circuits of the video processing circuitry (for example, spatial adaptation circuitry 32, temporal adaptation circuitry 34, adaptation correlation circuitry 36, scaling circuits 52-56, memory 58, adaptation correlation circuitry 60 (or elements, portions and circuitry therein or thereof)) may be integrated or may be implemented using a plurality of discrete logic, passive elements and/or active elements, and/or a state machine, a special or general purpose processor (suitably programmed) and/or a field programmable gate array (or combinations thereof). Indeed, all permutations and/or combinations of integrated, discrete, hardwired and programmable circuitry (which is programmed, for example, via software) for implementing the video processing circuitry (or portions thereof) are intended to fall within the scope of the present inventions.

Moreover, spatial adaptation circuitry 32, temporal adaptation circuitry 34, adaptation correlation circuitry 36, scaling circuits 52-56, memory 58, adaptation correlation circuitry 60 may also share circuitry with each other as well as with other elements of video receiving circuitry 10, video receiver device 10a and/or video processing circuitry 26. Moreover, the circuitry of spatial adaptation circuitry 32, temporal adaptation circuitry 34, adaptation correlation circuitry 36, scaling circuits 52-56, memory 58, adaptation correlation circuitry 60 (or components thereof) may also perform one or more other operations, which may be separate and distinct from that described herein.

As noted above, the present inventions may be employed in conjunction with any analog or digital broadcast transmission regime and video standard (for example, NTSC, PAL, SECAM, ATSC or DVB-T) whether now known or later developed. Moreover, the circuitry according to the present inventions may output video data in accordance with any video data output standard (for example, standard RGB video output standard—whether in, for example, NTSC, PAL or SECAM analog standards or ATSC, ISDB, DVB, or ITU-R BT.601 digital standards), whether now known or later developed; all of which, when adaptively processed in accordance with or using the present inventions, are intended to fall within the scope of the present inventions.

For example, in the exemplary embodiments hereof, the circuitry to decode and/or interpret keyed or tagged video content, as well as the circuitry to measure or assess the level or amount of interest may be comprised of or include one or more microprocessors, Application-Specific Integrated Circuits (ASICs), digital signal processors (DSPs), and/or programmable gate arrays (for example, field-programmable gate arrays (FPGAs)). Indeed, such circuitry may be any type or form of circuitry whether now known or later developed. For example, the circuitry may include a single component or a multiplicity of components (microprocessors, FPGAs, ASICs and DSPs), either active and/or passive, integrated or not, which are coupled together to implement, provide and/or perform a desired operation/function/application; all of which are intended to fall within the scope of the present inventions. Moreover, all permutations and/or combinations of hardwired and programmable circuitry (which is programmed, for example, via software) for implementing the operations (for example, transmitting, receiving, decoding, processing and evaluating circuitry) within the video receiver device described herein are intended to fall within the scope of the present inventions.

There are many inventions described and illustrated herein. While certain embodiments, features, attributes and advantages of the inventions have been described and illustrated, it should be understood that many others, as well as different and/or similar embodiments, features, attributes and advantages of the present inventions, are apparent from the description and illustrations. As such, the embodiments, features, attributes and advantages of the inventions described and illustrated herein are not exhaustive and it should be understood that such other, similar, as well as different, embodiments, features, attributes and advantages of the present inventions are within the scope of the present inventions.

For example, in one embodiment, the present invention includes spatial adaptation circuitry 32, temporal adaptation circuitry 34 and video manipulation circuitry 36 in a feed-forward/feedback architecture of FIG. 4C. In this embodiment, spatial adaptation circuitry 32 includes compression circuitry 66, filter circuitry 68 and interpolation circuitry 70 (see FIG. 17) and temporal adaptation circuitry 34 includes compression circuitry 44, buffer memory 42 and interpolator/interpolation circuitry 46 (see FIG. 7B).

Figure 19:
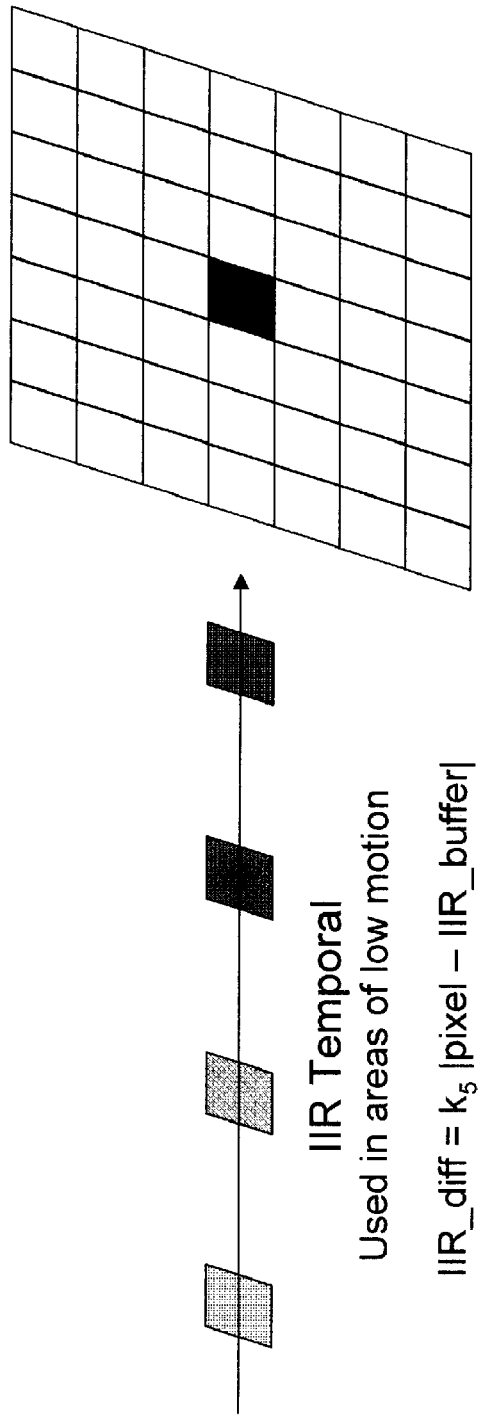
FIG. 19 is a schematic block diagram representation of exemplary video processing circuitry, according to at least certain aspects of the present inventions, wherein the video processing circuitry of this exemplary embodiment includes spatial adaptation, temporal adaptation and output data generation techniques.

In another embodiment, the video processing circuitry according to one aspect of the inventions includes an infinite impulse response type temporal filter and a finite impulse response spatial type filter to generate output video data. In this regard, the data of each pixel of the output video data output includes at least three elements includes (1) the data of the current input, (2) an average finite impulse response of an N×M matrix of neighboring pixels (for example, a 7×7 matrix wherein the pixel at issue is centered therein), and (3) an infinite impulse response of the pixel from a temporal buffer. (See, an exemplary representation thereof in FIG. 19).

Figure 3D:
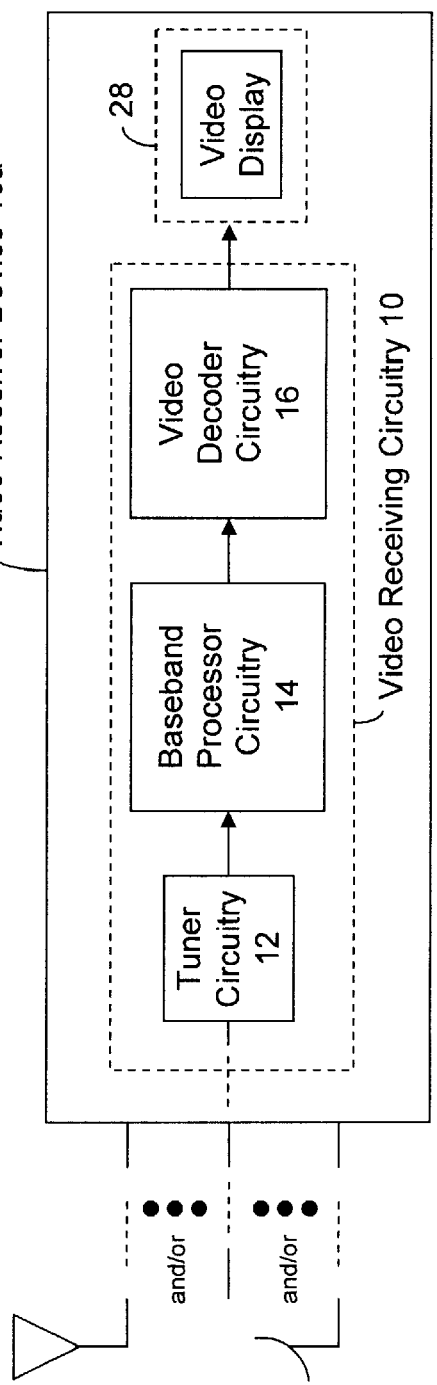
Figure 3F:
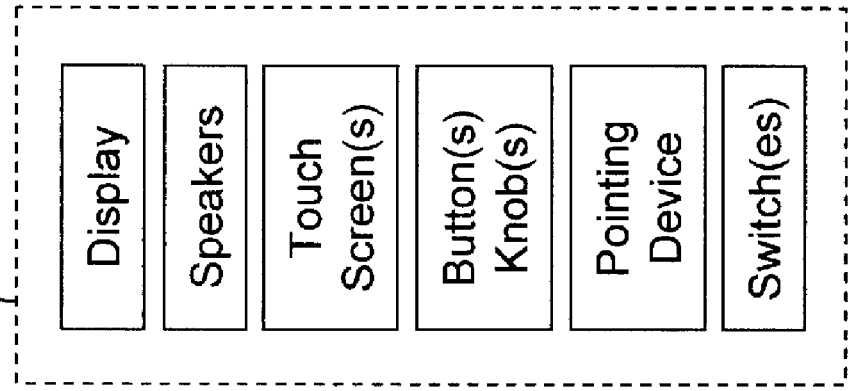
FIG. 3F is a block diagram representation of an exemplary user interface of video receiving circuitry and/or a video receiver device wherein the user interface includes a display and may include one or more of the other illustrated devices/mechanisms; notably, the user interface may be integrated in or external from the video receiver device.
Figure 3E:
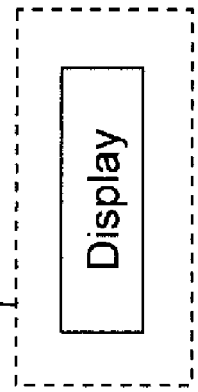
FIG. 3E is a block diagram representation of an exemplary user interface of video receiving circuitry and/or a video receiver device wherein the user interface includes a display.

Notably, in certain embodiments, the video receiver device may include a video display (see FIG. 3D); and in other embodiments, the video receiver device may couple to a video display which receives the video output data (see, for example, FIG. 3C).

Moreover, as noted above, the video receiving circuitry and/or video receiver device may be employed in a satellite, terrestrial and/or cable communications environments (among others). (See, for example, FIGS. 3A and 3B). For example, the present inventions may be implemented in a satellite, terrestrial and/or cable digital television environment and/or receiver (for example, digital broadcasting TV receiver, for example, mobile TV receiver). Indeed, video receiving circuitry and/or video receiver device may output video data to display, processor circuitry (for example, a special purpose or general purpose processor), and/or a video recording device. (See, for example, FIG. 3C).

Figure 20C:
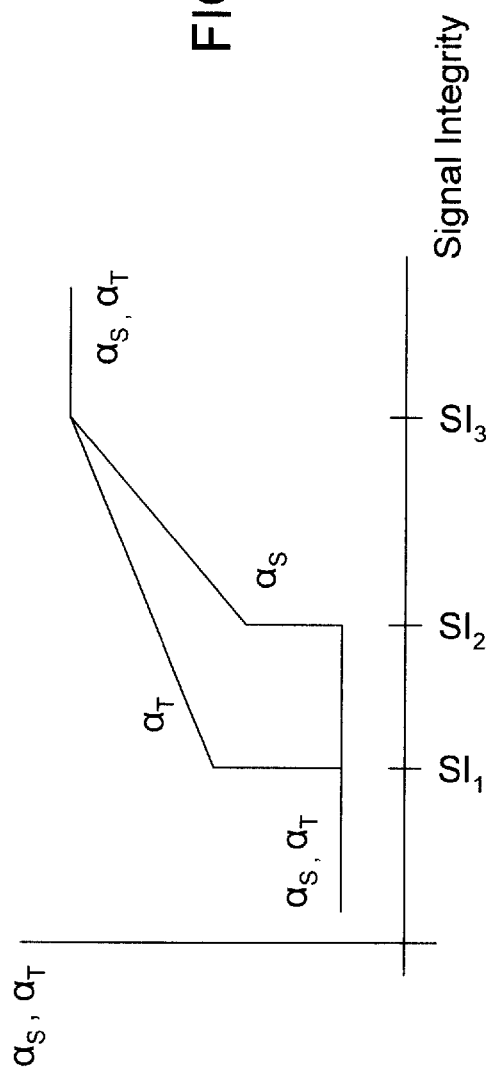
Figure 20D:
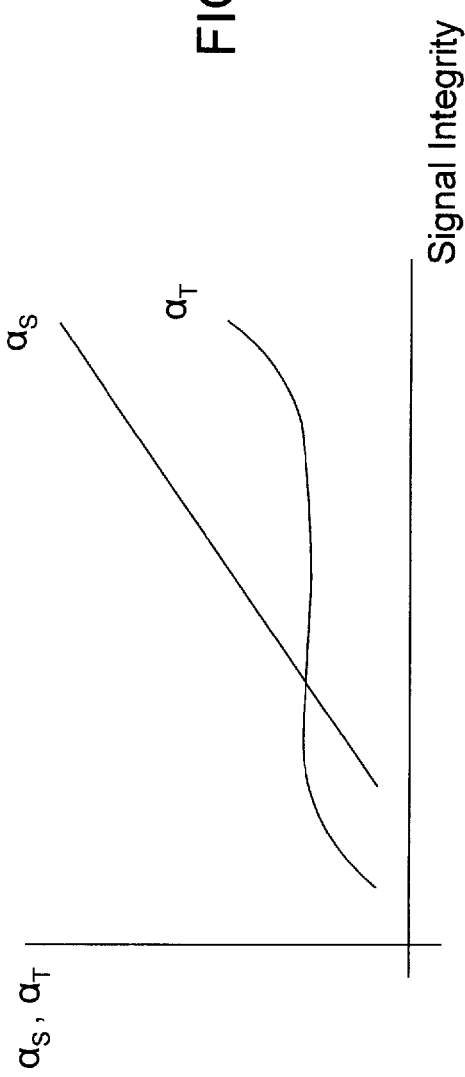

In addition, as discussed above, the adaptation correlation circuitry may determine or calculate one, some or all of the amount of scaling for the (i) video input data, (ii) spatially adapted video data, and (iii) temporally adapted video data. In one embodiment, the adaptation correlation circuitry may determine or calculate the amount of scaling using and/or based on the signal integrity of the input video signal (for example, the signal to noise ratio, signal strength and/or signal interference). For example, the signal processing circuitry, in relation to one or more threshold values of the signal integrity (for example, the SNR, signal strength and/or signal interference of, for example, demodulated video signal) may determine or calculate an amount of scaling for the video input data. (See, for example, FIGS. 20A-20C). In another embodiment, the amount of scaling may be employed in a combination of a discontinuous (see $SI_1$, $SI_2$, $SI_3$, etc.) and continuous relationship between the input (for example, measured SNR), and the calculated scaling values. (See, for example, FIGS. 20A-20C). In yet another embodiment, the amount of scaling may be employed in a continuous relationship between the input (for example measured SNR), and the calculated scaling values. (See, for example, FIG. 20D). All combinations and permutations of the amount of scaling (whether partially or fully continuous or discontinuous) for the (i) video input data, (ii) spatially adapted video data, and (iii) temporally adapted video data are intended to fall within the scope of the present inventions.

Importantly, the present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, many of those permutations and combinations are not discussed separately herein.

As such, the embodiments described and/or illustrated of the present inventions are merely exemplary. They are not intended to be exhaustive or to limit the inventions to the precise circuitry, techniques, and/or configurations disclosed. Many modifications and variations are possible in light of the above teaching. It is to be understood that other embodiments may be utilized and operational changes may be made without departing from the scope of the present inventions. As such, the foregoing description of the exemplary embodiments of the inventions has been presented for the purposes of illustration and description. Many modifications and variations are possible in light of the above teaching. It is intended that the scope of the inventions not be limited solely to the description above.

It should be noted that the term "circuit" may mean, among other things, a single component (for example, electrical/electronic and/or microelectromechanical) or a multiplicity of components (whether in integrated circuit form or otherwise), which are active and/or passive, and which are coupled together to provide or perform a desired function. The term "circuitry" may mean, among other things, a circuit (whether integrated or otherwise), a group of such circuits, one or more processors, one or more state machines, one or more processors implementing software, one or more gate arrays, programmable gate arrays and/or field programmable gate arrays, or a combination of one or more circuits (whether integrated or otherwise), one or more state machines, one or more processors, one or more processors implementing software, one or more gate arrays, programmable gate arrays and/or field programmable gate arrays. The term "data" may mean, among other things, a current or voltage signal(s) whether in an analog or a digital form.

Notably, the various circuitry described and/or illustrated herein (or portions and/or combinations thereof) may be integrated or may be implemented using a plurality of discrete logic, whether a state machine, a special or general purpose processor (suitably programmed) and/or a field programmable gate array (or combinations thereof). All permutations and/or combinations of integrated, discrete, hardwired and programmable circuitry (which is programmed, for example, via software) for implementing the analog-to-digital converter circuitry, image generation circuitry, output format circuitry, and/or synchronization circuitry are intended to fall within the scope of the present inventions.

Moreover, the circuitry of the video processing circuitry and/or video receiving circuitry may share circuitry, for example, share circuitry with other elements of the video receiver device (or components thereof) and/or perform one or more other operations, which may be separate and distinct from that described herein. For example, the synchronization circuitry may share circuitry with the image generation circuitry and/or output format circuitry. Indeed, such circuitry may be implemented via one or more state machines, one or more processor (suitably programmed) and/or one or more field programmable gate arrays.

It should be further noted that the various circuits and circuitry disclosed herein may be described using computer aided design tools and expressed (or represented), as data and/or instructions embodied in various computer-readable media, for example, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and HLDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). The present inventions are also directed to such representation of the video receiver device, video receiving circuitry (or portions thereof) and/or video processing circuitry, and/or techniques implemented thereby, and, as such, are intended to fall within the scope of the present inventions.

Indeed, when received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

Moreover, the various circuits and circuitry, as well as techniques, disclosed herein may be represented via simulations using computer aided design and/or testing tools. The simulation of the video receiver device, video receiving circuitry and/or video processing circuitry, and/or techniques implemented thereby, may be implemented by a computer system wherein characteristics and operations of such circuitry, and techniques implemented thereby, are imitated, replicated and/or predicted via a computer system. The present inventions are also directed to such simulations of the inventive video receiver device, video receiving circuitry (or portions thereof) and/or video processing circuitry, and/or techniques implemented thereby, and, as such, are intended to fall within the scope of the present inventions. The computer-readable media corresponding to such simulations and/or testing tools are also intended to fall within the scope of the present inventions.

What is claimed is:

1. A video processing circuitry to adaptively process input video data which corresponds to a plurality of video frames of a selected channel which is one of a plurality of channels of a broadcast spectrum, the video processing circuitry comprising:

spatial adaptation circuitry to generate and output spatially adapted video data corresponding to the plurality of video frames, including spatially adapted video data corresponding to a given video frame using video data of a video frame which is related to the given video frame;

temporal adaptation circuitry to generate and output temporally adapted video data corresponding to the plurality of video frames, including temporally adapted video data corresponding to the given video frame using video data which is temporally related to the given video frame; and video manipulation circuitry, coupled to the spatial adaptation circuitry and the temporal adaptation circuitry, to generate output video data corresponding to the plurality of video frames of the selected channel of the broadcast spectrum, using the input video data, the spatially adapted video data and the temporally adapted video data, wherein:

the video manipulation circuitry includes summer circuitry to generate output video data corresponding to the given video frame by summing, on a pixel-by-pixel, (i) the input video data corresponding to the given video frame, (ii) the spatially adapted video data which corresponds to the given video frame and (iii) the temporally adapted video data which corresponds to the given video frame.

2. The video processing circuitry of claim 1 wherein spatial adaptation circuitry generates each pixel of the given video frame by applying the input video data which corresponds to the given video frame to a spatially defocusing or blurring filter.

3. The video processing circuitry of claim 1 wherein spatial adaptation circuitry generates each pixel of the given video frame by applying the input video data which corresponds to the given video frame to a finite impulse response filter.

4. The video processing circuitry of claim 1 wherein temporal adaptation circuitry generates temporally adapted video data corresponding to the given video frame using video data which is representative of a sum, on a pixel-by-pixel, of video data of a plurality of video frames that temporally precede the given video frame.

5. The video processing circuitry of claim 1 further including a scaling circuit, coupled to the output of the temporal adaptation circuitry, to scale the temporally adapted video data.

6. The video processing circuitry of claim 1 further including a scaling circuit, coupled to the output of the spatial adaptation circuitry, to scale the spatially adapted video data.

7. The video processing circuitry of claim 6 wherein the amount of scaling of the spatially adapted video data by the scaling circuit is programmable.

8. The video processing circuitry of claim 6 wherein the amount of scaling of the spatially adapted video data by the scaling circuit is programmable during operation of the video processing circuitry.

9. The video processing circuitry of claim 6 wherein the amount of scaling by the scaling circuit of the spatially adapted video data corresponding to the given video frame is responsive to motion in the input video data corresponding to the given video frame.

10. The video processing circuitry of claim 6 further including motion detection circuitry, coupled to the scaling circuit, to generate a scale control signal which is representative of the amount of scaling applied by the scaling circuit to the spatially adapted video data corresponding to the given video frame.

11. The video processing circuitry of claim 1 further including:

a first scaling circuit, electrically coupled to an input of the video manipulation circuitry to scale the input video data used by the video manipulation circuitry, to generate output video data corresponding to the plurality of video frames;

a second scaling circuit, electrically coupled to an input of the video manipulation circuitry, to scale the spatially adapted video data used by the video manipulation circuitry to generate output video data corresponding to the plurality of video frames; and a third scaling circuit, electrically coupled to an input of the video manipulation circuitry, to scale the temporally adapted video data used by the video manipulation circuitry to generate output video data corresponding to the plurality of video frames.

12. The video processing circuitry of claim 11 wherein:

the amount of scaling by the first scaling circuit is programmable during operation of the video processing circuitry;

the amount of scaling by the second scaling circuit is programmable during operation of the video processing circuitry; and the amount of scaling by the third scaling circuit IS programmable during operation of the video processing circuitry.

13. The video processing circuitry of claim 12 further including adaptation correlation circuitry, coupled to the first, second and third scaling circuits, to generate a scale control signal, during operation of the video processing circuitry, which is representative of the amount of scaling applied by each of the scaling circuits.

14. A method of adaptively processing input video data which corresponds to a plurality of video frames of a selected channel which is one of a plurality of channels of a broadcast spectrum, the method comprising:

generating spatially adapted video data corresponding to the plurality of video frames;

generating temporally adapted video data corresponding to the plurality of video frames;

generating the output video data for each video frame of the plurality of video frames by summing, on a pixel-by-pixel basis, (i) the input video data, (ii) the spatially adapted video data and (iii) the temporally adapted video data of each video frame of the plurality of video frames; and outputting the output video data which corresponds to a plurality of video frames of the selected channel of the broadcast spectrum.

15. The method of claim 14 wherein generating the spatially adapted video data corresponding to the plurality of video frames includes generating the spatially adapted video data for each frame of the plurality of video frames by spatially defocusing or blurring the input video data of the plurality of video frames on a pixel-by-pixel basis.

16. The method of claim 14 wherein generating temporally adapted video data corresponding to the plurality of video frames includes generating temporally adapted video data for each video frame of the plurality of video frames by summing, on a pixel-by-pixel, video data of a video frame with one or more temporally preceding video frames.

17. The method of claim 14 further including scaling the spatially adapted video data, wherein generating output video data corresponding to the plurality of video frames uses a scaled version of the spatially adapted video data.

18. The method of claim 17 wherein the amount of scaling the spatially adapted video data is programmable during operation.

19. The method of claim 14 further including:
scaling the input video data, wherein generating output video data corresponding to the plurality of video frames uses a scaled version of the input video data;
scaling the temporally adapted video data, wherein generating output video data corresponding to the plurality of video frames uses a scaled version of the temporally adapted video data; and
determining an amount of scaling of the spatially adapted video data and the temporally adapted video data based on detecting motion in the video of the input video data.

20. A method of testing video processing circuitry which adaptively processes input video data corresponding to a plurality of video frames of a selected channel which is one of a plurality of channels of a broadcast spectrum, the method comprising:
applying signals to spatial adaptation circuitry to generate and output spatially adapted video data corresponding to the plurality of video frames;
applying signals to the temporal adaptation circuitry to generate and output temporally adapted video data corresponding to the plurality of video frames;
applying signals to video manipulation circuitry to generate output video data by summing, on a pixel-by-pixel basis, (i) the input video data, (ii) the spatially adapted video data and (iii) the temporally adapted video data of each video frame of the plurality of video frames; and
outputting the output video data which corresponds to a plurality of video frames of the selected channel of the broadcast spectrum.

21. A method of simulating video processing circuitry which adaptively processes input video data corresponding to a plurality of video frames of a selected channel which is one of a plurality of channels of a broadcast spectrum, the method comprising:
generating spatially adapted video data corresponding to the plurality of video frames;
generating temporally adapted video data corresponding to the plurality of video frames;
generating the output video data for each video frame of the plurality of video frames by summing, on a pixel-by-pixel basis, (i) the input video data, (ii) the spatially adapted video data and (iii) the temporally adapted video data of each video frame of the plurality of video frames; and
outputting the output video data corresponding to the selected channel of the broadcast spectrum.

* * * * *